United States Patent
Coffman et al.

(10) Patent No.: US 9,487,421 B2
(45) Date of Patent: Nov. 8, 2016

(54) MODULAR HIGH PERFORMANCE BIOSWALE AND WATER TREATMENT SYSTEM AND METHOD

(71) Applicants: Jeff Howard Coffman, Huntington Beach, CA (US); Guy Stivers, Tustin, CA (US)

(72) Inventors: Jeff Howard Coffman, Huntington Beach, CA (US); Guy Stivers, Tustin, CA (US)

(*) Notice: Subject to any disclaimer, the term of this patent is extended or adjusted under 35 U.S.C. 154(b) by 95 days.

(21) Appl. No.: 14/017,224

(22) Filed: Sep. 3, 2013

(65) Prior Publication Data

US 2014/0138307 A1 May 22, 2014

Related U.S. Application Data

(60) Provisional application No. 61/696,163, filed on Sep. 1, 2012.

(51) Int. Cl.
*C02F 3/32* (2006.01)
*C02F 1/00* (2006.01)

(52) U.S. Cl.
CPC .............. *C02F 3/327* (2013.01); *C02F 1/004* (2013.01); *C02F 2203/006* (2013.01); *Y02W 10/18* (2015.05)

(58) Field of Classification Search
CPC .. C02F 3/327; C02F 1/004; C02F 2203/006; Y02W 10/18
USPC ................... 210/602, 615, 616, 617, 170.03
See application file for complete search history.

(56) References Cited

U.S. PATENT DOCUMENTS

| | | | |
|---|---|---|---|
| 4,013,559 A | * | 3/1977 | Johnson .................. 210/151 |
| 4,419,232 A | | 12/1983 | Arntyr et al. |
| 5,030,343 A | | 7/1991 | Urriola |

(Continued)

FOREIGN PATENT DOCUMENTS

GB            1136530     12/1968
WO    WO 2009/030896 A1    3/2009

OTHER PUBLICATIONS

U.S. Appl. No. 13/764,738, filed Feb. 11, 2013, Stivers.

(Continued)

*Primary Examiner* — Fred Prince
(74) *Attorney, Agent, or Firm* — Knobbe, Martens, Olson & Bear LLP

(57) ABSTRACT

A scalable, modular water filtration and re-capture system is disclosed, such as for use as a high performance bioswale, or other purposes. The system includes a filter container with a removable cartridge that contains a filter media soil and planted vegetation, which may be for example one or more hyperaccumulators. The filter container is stacked together with a cistern container and in fluid communication therebetween to form a stacked container pair as a water filter and capture module. This allows for efficient servicing and removability of the filter cartridge, such as in bioswale, below ground, or above ground configurations. Water inflows and outflows may be circulated for varieties of reclamation uses, or treated water may simply be stored or conveyed into the ground. Multiple such modules may be secured together in custom scalable configurations to meet various needs and intended uses for water volumes, available space or terrain, or specific water treatment needs. In some embodiments, a single individual can replace the cartridges as needed.

38 Claims, 22 Drawing Sheets

(56) References Cited

U.S. PATENT DOCUMENTS

| | | | |
|---|---|---|---|
| 5,037,541 A | 8/1991 | Ruey-Jang et al. | |
| 5,269,094 A * | 12/1993 | Wolverton et al. | 47/66.6 |
| 5,322,629 A | 6/1994 | Stewart | |
| 5,372,714 A | 12/1994 | Logue, Jr. | |
| 5,511,904 A | 4/1996 | Van Egmond | |
| 5,618,428 A * | 4/1997 | Oslund | 210/602 |
| 5,707,527 A | 1/1998 | Knutson et al. | |
| 5,720,574 A | 2/1998 | Barella | |
| 5,788,409 A | 8/1998 | Johnson | |
| 5,810,510 A | 9/1998 | Urriola | |
| 6,149,803 A | 11/2000 | DiLoreto, Jr. et al. | |
| 6,241,882 B1 | 6/2001 | Allard | |
| 6,277,274 B1 * | 8/2001 | Coffman | 210/150 |
| 6,334,953 B1 | 1/2002 | Singleton | |
| 6,527,477 B1 | 3/2003 | Allard | |
| 6,551,023 B2 | 4/2003 | Allard | |
| 6,562,233 B1 | 5/2003 | Schilling et al. | |
| 6,641,335 B1 | 11/2003 | Allard | |
| 6,648,549 B1 | 11/2003 | Urriola | |
| 6,733,209 B2 | 5/2004 | Allard | |
| 6,779,946 B1 | 8/2004 | Urriola et al. | |
| 6,869,528 B2 | 3/2005 | Pank | |
| 6,872,029 B2 | 3/2005 | Allard et al. | |
| 6,875,350 B2 | 4/2005 | Allard | |
| 6,905,599 B2 | 6/2005 | Allard | |
| 6,976,808 B2 | 12/2005 | Allard | |
| 6,986,621 B2 | 1/2006 | Allard | |
| 7,014,782 B2 | 3/2006 | D'Emidio et al. | |
| 7,040,838 B2 | 5/2006 | Allard et al. | |
| 7,056,058 B2 | 6/2006 | Urriola et al. | |
| 7,165,913 B2 | 1/2007 | Allard et al. | |
| 7,182,874 B2 | 2/2007 | Allard et al. | |
| D539,923 S | 4/2007 | Urriola | |
| D539,924 S | 4/2007 | Urriola | |
| D555,809 S | 11/2007 | Urriola | |
| 7,374,364 B2 | 5/2008 | Allard et al. | |
| D571,023 S | 6/2008 | Urriola | |
| D596,698 S | 7/2009 | Urriola | |
| D596,699 S | 7/2009 | Urriola | |
| 7,686,540 B2 | 3/2010 | Urriola | |
| 7,897,047 B2 | 3/2011 | Wanielista | |
| 7,985,335 B2 | 7/2011 | Allard | |
| 9,162,169 B1 | 10/2015 | Stivers | |
| 9,175,463 B1 | 11/2015 | Stivers | |
| 2002/0113025 A1 | 8/2002 | Gauldin et al. | |
| 2004/0011731 A1 | 1/2004 | Sanguinetti | |
| 2004/0173522 A1 | 9/2004 | Allard | |
| 2005/0109693 A1 | 5/2005 | Allard | |
| 2005/0184007 A1 | 8/2005 | Allard et al. | |
| 2006/0060523 A1 * | 3/2006 | Kerns | 210/602 |
| 2006/0078387 A1 | 4/2006 | Allard et al. | |
| 2006/0133897 A1 | 6/2006 | Allard et al. | |
| 2007/0199869 A1 * | 8/2007 | Al-Assfour | 210/164 |
| 2007/0274784 A1 | 11/2007 | Allard et al. | |
| 2008/0056625 A1 * | 3/2008 | Stanton et al. | 383/104 |
| 2008/0073277 A1 | 3/2008 | Paoluccio et al. | |
| 2008/0251448 A1 | 10/2008 | Kent | |
| 2008/0251470 A1 * | 10/2008 | Kent | 210/791 |
| 2009/0101553 A1 * | 4/2009 | Lucas | 210/164 |
| 2009/0250405 A1 | 10/2009 | Allard | |
| 2009/0279953 A1 | 11/2009 | Allard et al. | |
| 2009/0305379 A1 | 12/2009 | Johnson et al. | |
| 2010/0200480 A1 | 8/2010 | Kania | |
| 2010/0206790 A1 * | 8/2010 | Holtz | 210/150 |
| 2011/0011780 A1 * | 1/2011 | Izumo | 210/170.05 |
| 2011/0094153 A1 | 4/2011 | Urriola | |
| 2011/0147303 A1 | 6/2011 | Allard | |
| 2011/0278237 A1 | 11/2011 | McInnis | |
| 2011/0284442 A1 * | 11/2011 | Williams | 210/170.09 |
| 2012/0031854 A1 | 2/2012 | Allard | |
| 2012/0091057 A1 * | 4/2012 | Kent et al. | 210/602 |
| 2012/0132581 A1 | 5/2012 | Williams et al. | |
| 2012/0145612 A1 * | 6/2012 | McInnis et al. | 210/163 |
| 2012/0152827 A1 | 6/2012 | Allard | |
| 2013/0001158 A1 * | 1/2013 | Condon et al. | 210/602 |
| 2013/0299435 A1 | 11/2013 | Coffman et al. | |
| 2014/0138307 A1 | 5/2014 | Coffman et al. | |

OTHER PUBLICATIONS

U.S. Appl. No. 14/017,224, Office Action mailed Jun. 18, 2015, 11 pages, (US Publ. No. 2014-0138307 A1).

* cited by examiner

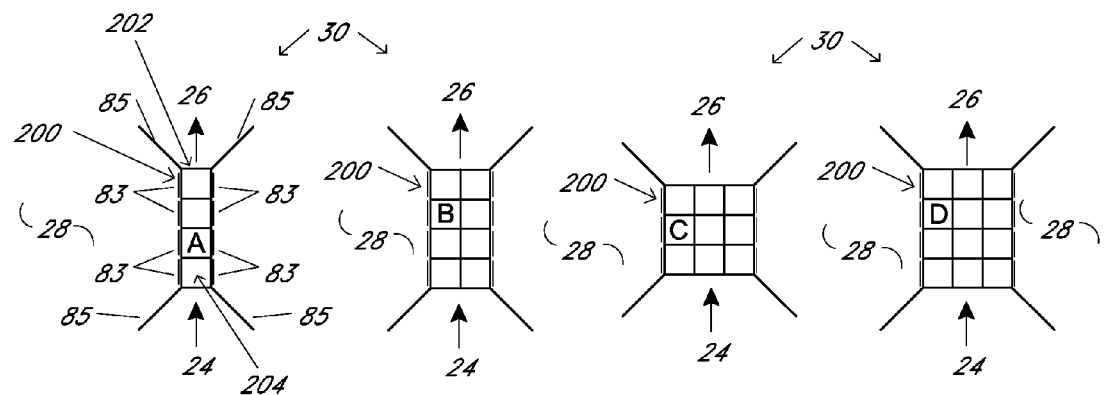
*Fig. 4A*  *Fig. 4B*  *Fig. 4C*  *Fig. 4D*
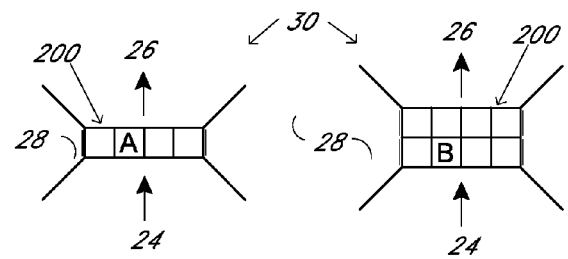
*Fig. 4E*  *Fig. 4F*
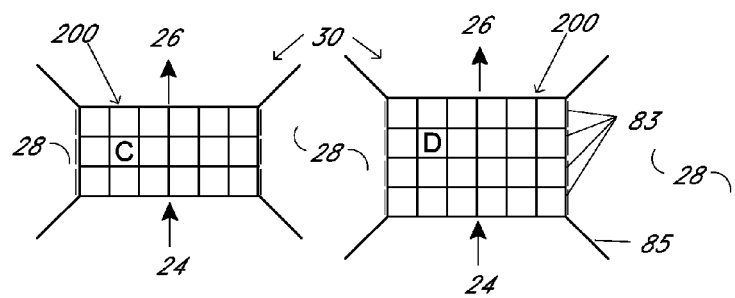
*Fig. 4G*  *Fig. 4H*

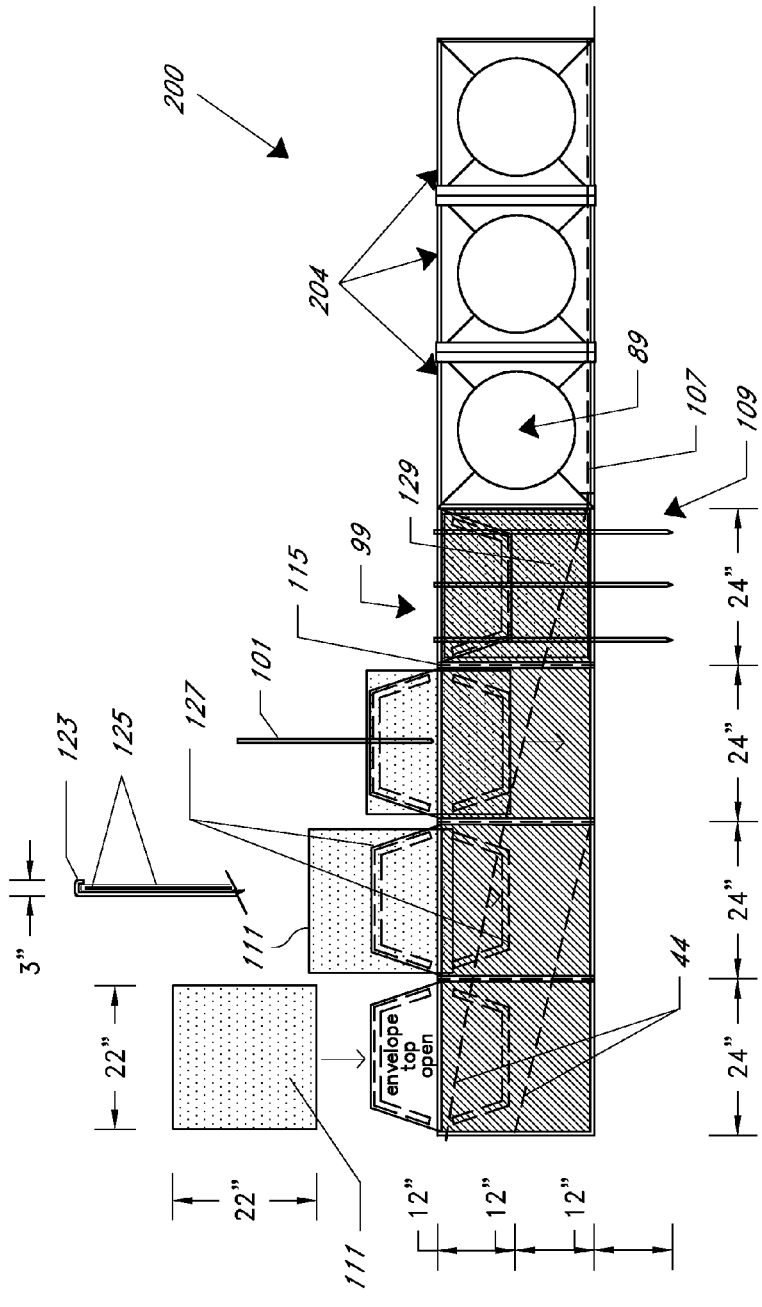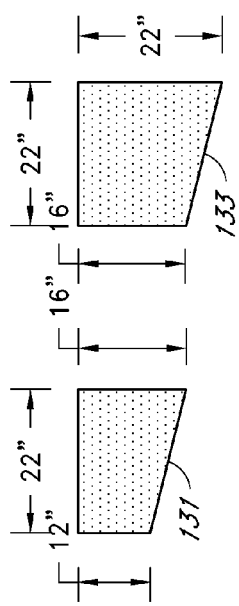

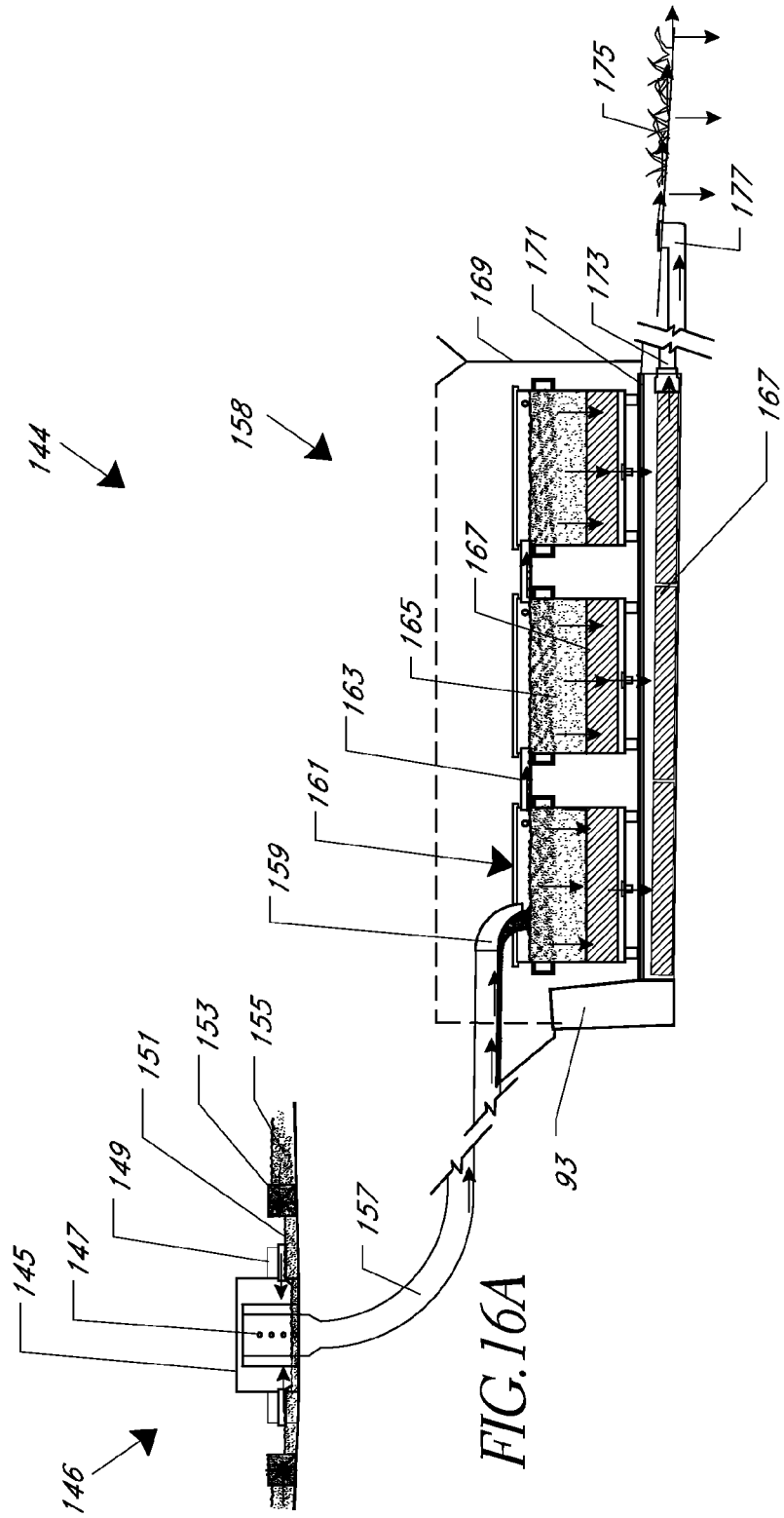

MODULAR HIGH PERFORMANCE BIOSWALE AND WATER TREATMENT SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57, including without limitation this application claims benefit of priority to related U.S. provisional patent application Ser. No. 61/696,163 for "MODULAR HIGH PERFORMANCE BIOSWALE AND WATER TREATMENT SYSTEM AND METHOD," filed on Sep. 1, 2012, which is herein incorporated in its entirety by reference.

BACKGROUND OF THE INVENTION

1. Field of the Invention

This invention relates to water treatment and/or reclamation systems and methods, including a modular high performance bioswale system and method.

2. Description of the Related Art

Numerous needs exist for treating water, such as to filter constituents such as mineral, chemical, biological, or other particulate contaminants in attempt to achieve clean water to meet various purity goals and/or requirements. Bioswales are created and often used as a standard approach intended to gather and treat water run-off created on or from landscapes, such as storm water, irrigation run-off, or other run-off from other sources. A bioswale is typically located to receive water run-off that is funneled to the bioswale on or from a landscape due to natural landscape grading, or engineered landscape architectural design for this purpose. Typical bioswales comprise a "biologic" reservoir of specific soil and plant life vegetation (e.g. "hyperaccumulators") which are designed to cleanse water spilled into the reservoir of various constituent contaminants. However, these typical bioswales are not sufficient to provide high performance filtration of many contaminants, and have limited "life" before they must be dug up and replaced with a new bioswale (e.g. every 2-5 years, depending on water fall and contaminant load). More recently, certain engineered solutions have been proposed and some in fact have been put in use for filtering, and reclaiming, water run-off. However, these alleged solutions have several shortcomings.

In the United States, the EPA has certain requirements on municipalities and other public and commercial institutions, and more recently even impacting private property owners and developers, to treat water run-off from their properties—and sufficiently to meet certain test standards of the treated water quality leaving the property. These new regulations are spreading nationally across the states, and mark an urgent need for more efficient and effective water run-off treatment solutions.

There is an increasing need for a high performance bioswale that is engineered to provide optimal filtration performance across a wide range of contaminants, with efficient filtration and reclamation capacity, and permitting efficient and cost-effective installation and removal (as well as maintenance in servicing and "refreshing" the filtration media), and which is also modular and scalable to accommodate a wide range of specific environments of use.

SUMMARY OF THE INVENTION

Various aspects and related modes, embodiments, features, and variations are described throughout this disclosure, generally related to systems, related assemblies and components, and methods related to water filtration and/or reclamation. Particularly highly beneficial aspects include, for example, high performance bioswale systems and related methods, and swill and other greywater recyclers. Certain specific modes include, for example but without limitation, above ground and below ground water filtration and/or treatment systems and methods.

According to one beneficial aspect, a high performance bioswale ("HPB") system and method comprises a filtration module with a first container which contains a replaceable filter cartridge. The filter cartridge according to one mode comprises a "wetland in a bag" or "WIB" which include filter media held within a bag or jacket having at least two permeable inlet and outlet portions to allow water flow therethrough. According to one mode, live plant and/or other vegetation is planted with a root system grown into the filter media. According to one embodiment, the plant or vegetation comprises at least one hyperaccumulator. In another mode, the filtration module is located atop a second container which comprises a cistern for water collection. The top filtration module and bottom second container together comprise a gravity water filtration and collection HPB module. In one embodiment, the cistern is coupled to an outflow conduit to convey collected filtered water away from the HPB. In another embodiment, at least a portion of the cistern is permeable to allow collected filtered water from the filtration module to permeate into the ground adjacent the cistern. According to one more particular embodiment, the permeability is provided on the bottom of the cistern. According to another more particular embodiment, the permeability is provided along at least a portion of a side wall of the cistern. According to another embodiment, a plurality of such gravity water filtration and collection HPB modules are provided in an array.

According to another aspect of this disclosure, an HPB is provided with water filtration module system having at least a first pair of substantially non-permeable (to water) side erosion control panels extending from spaced first and second locations of the module system, respectively, at relative diverging angles therefrom. The water filtration module system is positioned within the direction of a water flow path. The convergence of the side erosion control panels toward the filtration module system provides a funneling structure to direct the water inflow from water flow path and into the water filtration module system.

According to one mode of this aspect, a grade is provided to allow the water flow path to be directed toward the filtration module system. According to another mode, a sand or other earth material backfill is provided behind the erosion control panels relative to the direction of water inflow. According to another mode, the erosion control panels are secured to the ground by means of a plurality of securements. According to one embodiment of this mode, the securements comprise stakes driven through stake couplers of the panels. According to another mode, the HPB comprises a first pair of said side erosion control panels positioned to funnel water inflow into the filtration module system, and a second pair of said side erosion control panels opposite the first pair and configured to direct water outflow from the filtration module system away from the filtration module system. According to another mode, a substantially non-permeable (to water) bottom erosion control panel extends from a front portion of the filtration module system and is secured to the ground there below. This is configured to prevent water erosion of the water inflow into the ground below the front edge of the filtration module system. In another mode, a substantially non-permeable (to water) bottom erosion control panel extends from a back portion of the filtration module system and secured to the ground there below—and prevents water erosion of the ground below the back end of the filtration module system.

According to another mode of this aspect, the filtration module system comprises at least one filtration module comprising a container which contains a filter media. According to one embodiment of this mode, the filter media comprises a soil and at least one plant or other vegetation is planted with a root system growing within the filter media. According to one more detailed embodiment, the plant comprises a hyperaccumulator. According to another embodiment, the filter media is contained within a bag, sock, or other form of jacket or cover. In one more particular embodiment, at least a portion of the cover is characterized as being permeable to water flow while substantially containing the filter media.

Another aspect of this disclosure is a modular water filtration system for treating a volume of water along a flow path. The system according to this aspect includes a filter container, a removable cartridge that fits within the filter container and with a filter media soil planted with vegetation with roots in the media soil, and a cistern container to capture the water filtered through the filter container.

According to one mode, one, two, or all three of the filter container, cartridge, and cistern containers are portable, constructed containers with constructed walls.

According to another mode, the filter container comprises a first wall containing a first volume and with a first opening through which the first volume communicates externally of the first container and also with a first water permeable section.

According to another mode, this system also includes a portable, constructed cartridge comprising a second constructed wall containing a second volume and with a second opening and a second water permeable section.

In another mode, a filtration media soil is housed within the second volume of the cartridge.

In another mode, a plant that is planted with roots in the filtration media soil and extending through the second opening from the cartridge.

In another mode, the cartridge is contained at least in part within the first volume of the filter container in an orientation with the plant extending through the first and second openings, and with the first and second water permeable sections substantially aligned with fluid communication therebetween, and such that the cartridge and planted filtration media soil is removable from the filter container through the first opening.

In another mode, the system also comprises a cistern container with a third wall containing a third volume and with a third water permeable section.

In one further mode, the filter container and cartridge contained therein is secured in a stacked position adjacent to the cistern container in relative orientation together comprising a stacked container pair with the first, second, and third water permeable sections substantially aligned with fluid communication therebetween.

In another mode, the filter container is positioned relative to the flow path such that the volume of water flows into the first opening, through the rooted filtration media soil, across the interfacing first, second, and third permeable sections, respectively, and is captured within the third volume of the cistern container, such that the stacked filter and cistern container pair together comprise a water filtration and capture module.

Another aspect is modular water filtration system for treating a volume of water along a flow path. The system according to this aspect includes: a portable, constructed filter container with a first constructed wall containing a first volume and with a first opening through which the first volume communicates externally of the first container and also with a first water permeable section; a portable, constructed cartridge comprising a second constructed wall containing a second volume and with a second opening and a second water permeable section; a filtration media soil housed within the second volume of the cartridge; and a plant that is planted with roots in the filtration media soil and extending through the second opening from the cartridge. The cartridge is contained at least in part within the first volume of the filter container in an orientation with the plant extending through the first and second openings, and with the first and second water permeable sections substantially aligned with fluid communication therebetween, and such that the cartridge and planted filtration media soil is removable from the filter container through the first opening. A cistern container with a third wall is also provided and contains a third volume and with a third water permeable section. The filter container and cartridge contained therein is positioned in a stacked relationship adjacent to the cistern container in relative orientation together comprising a stacked container pair with the first, second, and third water permeable sections substantially aligned with fluid communication therebetween. The filter container is positioned relative to the flow path such that the volume of water flows into the first opening, through the rooted filtration media soil, across the interfacing first, second, and third permeable sections, respectively, and is captured within the third volume of the cistern container, such that the stacked filter and cistern container pair together comprise a water filtration and capture module.

According to one further mode of one or more of the foregoing aspects, the system further comprises a water inflow conveyance coupled to the first opening of the filter container and configured to direct the flow path of the volume of water into the module.

According to one embodiment of this mode, the water inflow conveyance comprises a constructed conduit providing the flow path from a first location of the volume of water into the filter container. According to still a further embodiment, the constructed conduit comprises a pipe. According to yet another further embodiment, the water inflow conveyance comprises a sloped grading of a region of adjacent ground adjacent to the module and configured to direct ground flow into the flow path into the module. In still another further embodiment, the water inflow conveyance comprises at least one flow diverter wall positioned within a first flow path to divert the volume of water from the first flow path into the flow path into the module.

According to another mode of one or more of the foregoing water filter and capture module aspects, the filter container is positioned vertically above the cistern container resting upon a ground surface such that the stacked container pair comprises a vertically stacked container pair; and the flow path comprises a relatively vertical downward flow at least in part influenced by gravity and such that the module comprises at least in part a water gravity filtration and capture module.

In one embodiment of this mode, the ground surface comprises a subterranean ground surface within a recess formed below an adjacent ground surface adjacent to the module. In still a further feature that may also be provided according to this embodiment, for example, the adjacent ground surface is graded in a manner to collect the volume of water toward and onto the module for gravity filtration flow through the module.

In another embodiment of this mode, the ground surface is configured relative to an adjacent ground surface such that the module sits at least in part above ground, and further comprising a water inflow conveyance configured to direct the volume of water into the filter container of the module above ground.

According to another mode of one or more of the foregoing filter and capture container module aspects, the module is positioned with the filter container horizontally next to the cistern container, such that both the filter and cistern containers rest upon a ground surface such that the stacked container pair comprises a horizontally stacked container pair.

According to another filter/cistern container pair module mode, a water outflow path is also provided by which the volume of filtered water captured by the cistern container flows out from the cistern container.

According to another filter/cistern container pair module mode, the cistern container comprises a fourth water permeable section, and the water outflow path comprises a path through the fourth water permeable section. In one embodiment of this mode, the fourth water permeable section comprises a side wall of the cistern container relative to a ground surface upon which the cistern container sits. In another embodiment, the fourth water permeable section comprises a bottom of the cistern container relative to a ground surface upon which the cistern container sits.

According to another filter/cistern container pair module mode, at least one of the first, second, third, or fourth water permeable sections comprises an additional opening through the respective wall. In one embodiment, at least one water permeable section comprises a porous membrane, film, or liner, and the additional opening comprises a pore thereof. In another embodiment, at least one water permeable section comprises a patterned material with an inter-connected network of filaments, and the additional opening comprises a gap between filaments of the patterned material. In still a further embodiment, the patterned material comprises a geotextile fabric.

According to another filter/cistern container pair module mode, at least one of the first, second, third, or fourth water permeable sections comprises a solid wall, and the additional opening comprises a void or aperture formed through the solid wall.

According to another filter/cistern container pair module mode, the plant comprises a hyperaccumulator.

According to another filter/cistern container pair module mode, the filtration media soil comprises a living biological material.

According to another filter/cistern container pair module mode, the system further comprises a plurality of such modules, wherein each said module of the plurality is stacked adjacent to another said module to form a multi-modular assembly of stacked filtration and cistern container pairs.

According to one embodiment of this mode, each volume of water filtered and captured by each said module comprises a portion of a larger volume of water conveyed to the system.

According to another embodiment, the respective filter and cistern container of each stacked pair of each module is in similar relative orientation, relative to the ground, as the other modules.

According to another embodiment, the larger volume of water is apportioned into separate portions flowing along separate flow paths into each module by a water in-flow conveyance. In one further embodiment, the water in-flow conveyance comprises a semi-permeable liner over the filter containers and with a plurality of apertures aligned for fluid communication with each first opening of each filter container of each module.

According to another embodiment, the water inflow conveyance comprises a constructed conduit directing the larger volume of water from a first location into separate respective flow paths with respective apportioned volumes into each filter container. In still another further embodiment, the water inflow conveyance comprises a pipe. In yet still another further embodiment, the pipe comprises a series of ports through which water exits the pipe and conveys across a multiple said modules with at least one of the pipe apertures aligned with one of the first openings of the filter container of each module for conveying the respective apportioned volumes of water from the larger volume into said respective modules.

According to another embodiment of the multi-modular filter/cistern container pair modes, a securement assembly is configured to secure the plurality of adjacent modules in relative position relative to each other. In one embodiment, the securement assembly comprises a jacket around the plurality of modules. In another embodiment, the securement assembly comprises a strap secured and tightened around the plurality of modules. In another embodiment, the securement assembly comprises a plurality of individual fasteners between each adjacent pair of modules, such that an interconnected network of modules is formed.

According to another mode of the one or more of the filter/cistern module aspects disclosed, the cistern container comprises a recessed well formed in a structure adjacent to the filter container. In one embodiment, the structure comprises a ground structure. In another embodiment, the cistern container comprises a portable, constructed container with a constructed wall.

According to another mode of the one or more of the filter/cistern module aspects disclosed, the system further comprises a forebay coupled to the module and comprising a reservoir. In one further mode, a first inflow conveyance is coupled to the forebay and configured to direct a first volume of water from a first inlet flow into the reservoir of the forebay; and a coupling conveyance is also provided and configured to couple and direct the volume of water from the forebay and into the module through the first opening of the filter container.

In one embodiment, the coupling conveyance comprises spill-over flow path from the forebay, when filled past a threshold volume, and into the flow path into the filter container.

In another embodiment, the forebay further comprises a desiltation assembly configured to desilt the first volume of water prior to conveyance to the filter container of the stacked container module.

In another embodiment, the forebay comprises a wall with a permeable forebay section between the forebay and a second cistern container, and configured such that at least a portion of the first volume of water received within the reservoir passes through the permeable forebay section to the second cistern container. In still a further embodiment, the forebay comprises a forebay filter between and fluidly coupled to the reservoir and the permeable forebay section so as to filter the water flowing from the forebay into the second cistern.

In another mode of a filter/cistern container pair module system aspect disclosed, an access conduit is coupled between a location externally of the module and the third volume within the cistern container. In one embodiment, the access conduit comprises a fluid passageway. In another embodiment, a vacuum suction source is coupled to the fluid passageway for aspirating the filtered water from the cistern. In another embodiment, the access conduit is configured for visual inspection into the cistern.

In another filter/capture paired container module mode, an outflow conveyance is coupled to the third volume within the cistern and configured to convey the filtered volume of water from the cistern and to a remote location.

In one embodiment, the outflow conveyance comprises a pump coupled to the cistern.

In another embodiment, a remote storage reservoir is coupled to the outflow conveyance and configured to receive and store the filtered volume of water received thereby from the cistern.

In another embodiment, an irrigation system is coupled to the outflow conveyance or an intervening storage reservoir coupled to the outflow conveyance and configured to direct the conveyed outflow through the irrigation system.

In another embodiment, a sensor is coupled to the third volume of the cistern container. In one further embodiment, the sensor comprises a water quality sensor. In another further embodiment, the sensor comprises a volume sensor configured to sense a volume of water contained within the cistern.

According to another mode of the modular filter/cistern paired container aspects of this disclosure, the cartridge removably coupled to the filter container further comprises at least one handle configured to lift the cartridge out from the filter container.

According to a further mode of the multi-modular filter/cistern paired container systems disclosed, the cistern containers from each of the modules are in fluid communication with each other, such that water entering or contained within the plurality of cistern containers are distributed therebetween.

In one embodiment, the plurality of cistern containers together comprise an outer perimeter with perimeter sides and a perimeter bottom, within which all the cistern containers are contained, and wherein a portion of the outer perimeter is non-permeable to water outflow from the cistern containers and outside of the outer perimeter. In one further embodiment, a portion of the outer perimeter is permeable to water outflow from the cistern containers and outside of the outer perimeter. In another further embodiment, the perimeter bottom is permeable, and the perimeter sides are non-permeable. In another further embodiment, only a portion of the perimeter bottom is permeable. In another further embodiment, at least a portion of the perimeter side and at least a portion of the perimeter bottom are permeable for water outflow.

Another aspect of the present disclosure is a water treatment system for treating a volume of water along a flow path, and which comprises a filter container, a water treatment assembly, and an adjustable flow diverter. The filter container has a first wall containing a first volume and with first and second water permeable sections, with the water treatment assembly housed within the first volume. The adjustable flow diverter is coupled to the filter container and comprises a second wall that is adjustable between a first configuration that is retracted in relative close proximity relative to the first wall and a second configuration that extends further away from the first wall relative to the first configuration. The adjustable flow diverter adjusted into the second configuration is configured to direct flow from a first flow path toward the flow path to the first water permeable section, such that the volume of water flows through the water treatment assembly and out of the filter container through the second permeable section.

Another aspect of the present disclosure is a water treatment system for treating a volume of water, comprising a first treatment assembly in cooperation with a second treatment assembly as follows. The first treatment assembly comprises a first filter with a first filtering characteristic that filters a first constituent from the volume of water. The second treatment assembly comprises a second filter with a second filtering characteristic that filters a second constituent from the volume of water. A water in-flow conveyance is also provided that directs the volume of water from a first location in an initial contaminant condition into and through the first filter, such that the volume of water is filtered with respect to the first constituent to a first-treated condition. Another coupling conveyance directs the volume of water in the pre-treated condition from the first treatment assembly to the second treatment assembly. The second treatment assembly is configured to direct the volume of water in the pre-treated condition through the second filter, such that the volume of water is filtered with respect to the second constituent to a second-treated condition.

According to one mode of this aspect, the first and second constituents comprise the same constituent, and the second treatment assembly is a polishing treatment assembly with respect to the same constituent.

According to another mode, the first and second constituents are different unique respective constituents.

According to another mode, the first treatment assembly comprises a top-hat filter.

In one embodiment, the first treatment assembly comprises a pond-reservoir around the top-hat filter.

According to another mode, the second treatment assembly comprises a reservoir configured to receive the volume of water in the first treated condition and is coupled to and configured to direct flow of the volume of water in the first treated condition to and through the second filter, and to isolate the outflow from the second filter in the second treated condition from the conveyed inflow of the water into the reservoir in the first treated condition.

According to another mode, at least one of the first and the second treatment assemblies comprises a gravity filtration system.

According to another mode, the first and second treatment assemblies are positioned in spaced series along a flow path of the volume of water along a ground surface.

In one embodiment, the ground surface comprises a graded surface configured to direct flow of the volume of water along the flow path through the treatment assemblies.

Another aspect of the present disclosure is a modular water filtration system for treating a volume of water along a flow path, comprising a plurality of water treatment and collection modules. Each module comprises: a portable, constructed filter container with a first constructed wall containing a first volume and with a first opening through which the first volume communicates externally of the first container and also with a first water permeable section; and a portable, constructed cartridge comprising a second constructed wall containing a second volume housing a filtration media and also with second and third water permeable sections; wherein the cartridge is contained at least in part within the first volume of the filter container in an orientation with the first and second water permeable sections substantially aligned with fluid communication therebetween, and such that the cartridge is removable from the filter container through the first opening. Each module also includes a cistern container with a third wall containing a third volume and with a third water permeable section. The filter container and cartridge contained therein is securable in a stacked position adjacent to the cistern container in relative orientation together comprising a stacked filter and cistern container pair with the first, second, and third water permeable sections substantially aligned with fluid communication therebetween. Each of the plurality of modules is positioned approximately adjacent to another of the modules, and with similar relative orientation between the filter and cistern containers of the respective stacked container pairs, so as to form a multi-modular filtration and capture assembly. An inflow conveyance is coupled to direct the volume of water into the multi-modular filtration and capture assembly in a manner to convey the volume of water across the respective individual modules and into the respective filter containers therein. An outflow conveyance is coupled to the cistern containers of the multi-modular filtration and capture assembly in a manner configured to convey the filtered captured water therein out from the system.

According to one mode of one or more of the multi-modular filter/cistern container pair aspects herein disclosed, multiple such cistern containers are coupled in fluid communication between them, thereby allowing captured water within the coupled cistern containers to be distributed between the cistern containers.

Another aspect of the present disclosure is a method for treating and capturing a volume of water along a flow path via a modular water filtration and capture system, comprising the following steps. A portable, constructed filter container is provided with a first constructed wall containing a first volume and with a first opening through which the first volume communicates externally of the first container and also with a first water permeable section. A portable, constructed cartridge is also provided comprising a second constructed wall containing a second volume and with a second opening and a second water permeable section. A filtration media soil is positioned and housed within the second volume of the cartridge. A plant is planted with roots in the filtration media soil and such that the plant extends through the second opening from the cartridge. The cartridge is contained at least in part within the first volume of the filter container in an orientation with the plant extending through the first and second openings, and with the first and second water permeable sections substantially aligned with fluid communication therebetween, and such that the cartridge and planted filtration media soil is removable from the filter container through the first opening. Accordingly, this method also further comprises providing a cistern container with a third wall containing a third volume and with a third water permeable section. The filter container and cartridge contained therein are positioned in a stacked configuration adjacent to the cistern container in relative orientation together comprising a stacked container pair with the first, second, and third water permeable sections substantially aligned with fluid communication therebetween, such that the stacked filter and cistern container pair together comprise a water filtration and capture module. The filter container is positioned relative to the flow path such that the volume of water flows into the first opening, through the rooted filtration media soil, across the interfacing first, second, and third permeable sections, respectively, and is captured within the third volume of the cistern container.

Another aspect of the present disclosure is a method for treating a volume of water along a flow path via a water treatment system, comprising: providing a filter container with a first wall containing a first volume and with first and second water permeable sections; housing a water treatment assembly within the first volume; coupling an adjustable flow diverter with an adjustable wall to the filter container; adjusting the adjustable wall between a first configuration that is retracted in relative close proximity relative to the first wall and a second configuration that extends further away from the first wall relative to the first configuration; and directing flow of the volume of water with the adjustable flow diverter in the second configuration from a first flow path toward the flow path to the first water permeable section, such that the volume of water flows through the water treatment assembly and out of the filter container through the second permeable section.

Another aspect of the present disclosure is a method for treating water via a water treatment system, comprising: providing a first treatment assembly with a first filter with a first filtering characteristic that filters a first constituent from the volume of water; providing a second treatment assembly with a second filter with a second filtering characteristic that filters a second constituent from the volume of water; directing the volume of water from a first location in an initial contaminant condition into and through the first filter, thereby filtering the volume of water with respect to the first constituent to a first-treated condition; directing the volume of water in the pre-treated condition from the first treatment assembly to the second treatment assembly; and directing the volume of water in the pre-treated condition within the second treatment assembly through the second filter, such that the volume of water is filtered with respect to the second constituent to a second-treated condition.

Another aspect of the present disclosure is a method for providing a scalable, modular water filtration system for treating a volume of water along a flow path. This method comprises providing a plurality of water treatment and collection modules, by (a) providing each module with a portable, constructed filter container with a first constructed wall containing a first volume and with a first opening through which the first volume communicates externally of the first container and also with a first water permeable section; (b) providing each model a portable, constructed cartridge comprising a second constructed wall containing a second volume housing a filtration media and also with second and third water permeable sections; (c) housing each cartridge at least in part within the first volume of the respective filter container of the respective module in an orientation with the first and second water permeable sections substantially aligned with fluid communication therebetween, and such that the cartridge is removable from the filter container through the first opening; (d) providing each module with a cistern container with a third wall containing a third volume and with a third water permeable section; and (e) positioning the filter container and respective cartridge contained therein of each module in a stacked position adjacent to the respective cistern container of the module in relative orientation together comprising a stacked filter and cistern container pair with the first, second, and third water permeable sections substantially aligned with fluid communication therebetween.

According to the modules provided according to this aspect, the method according to a further mode comprises (i) positioning each of the plurality of modules approximately adjacent to another of the modules, and with similar relative orientation between the filter and cistern containers of the respective stacked container pairs, so as to form a multi-modular filtration and capture assembly; (ii) coupling an inflow conveyance to direct the volume of water into the multi-modular filtration and capture assembly in a manner to convey the volume of water across the respective individual modules and into the respective filter containers therein; and (iii) coupling an outflow conveyance to the cistern containers of the multi-modular filtration and capture assembly in a manner configured to convey the filtered captured water therein out from the system.

Each of the foregoing aspects, modes, embodiments, variations, or features is considered independently beneficial and not to necessarily require combination with the others. However, their various combinations as described or otherwise apparent to one of ordinary skill are also contemplated as further beneficial independent aspects of this disclosure. Other aspects not specifically described in detail above are also contemplated as made clear in the detailed description below. For example, additional aspects of the present disclosure comprises respective methods corresponding with manufacturing and using the systems and devices described in these aspects above, and in the description below—as would be apparent to one of ordinary skill. In addition, further more detailed modes, embodiments, features, and variations of such aspects described above and below are also herein contemplated.

BRIEF DESCRIPTION OF THE DRAWINGS

FIGS. 4A-H show top schematic views of various additional water filtration embodiments, respectively, of the present disclosure, and demonstrating the scalability and customizability of the present embodiments to accommodate many different configurations to meet varied specific requirements or desires for particular specific implementations.

FIG. 13 shows an elevation view of finer details of an articulated erosion control panel embodiment, such as for example similar to that described above by reference to FIG. 12.

FIGS. 16A-B show schematic views of each of two intercooperating module assemblies, respectively, that function in combination according to another water filtration system embodiment, and including a pre-treatment system and primary treatment system.

Figure 1A:
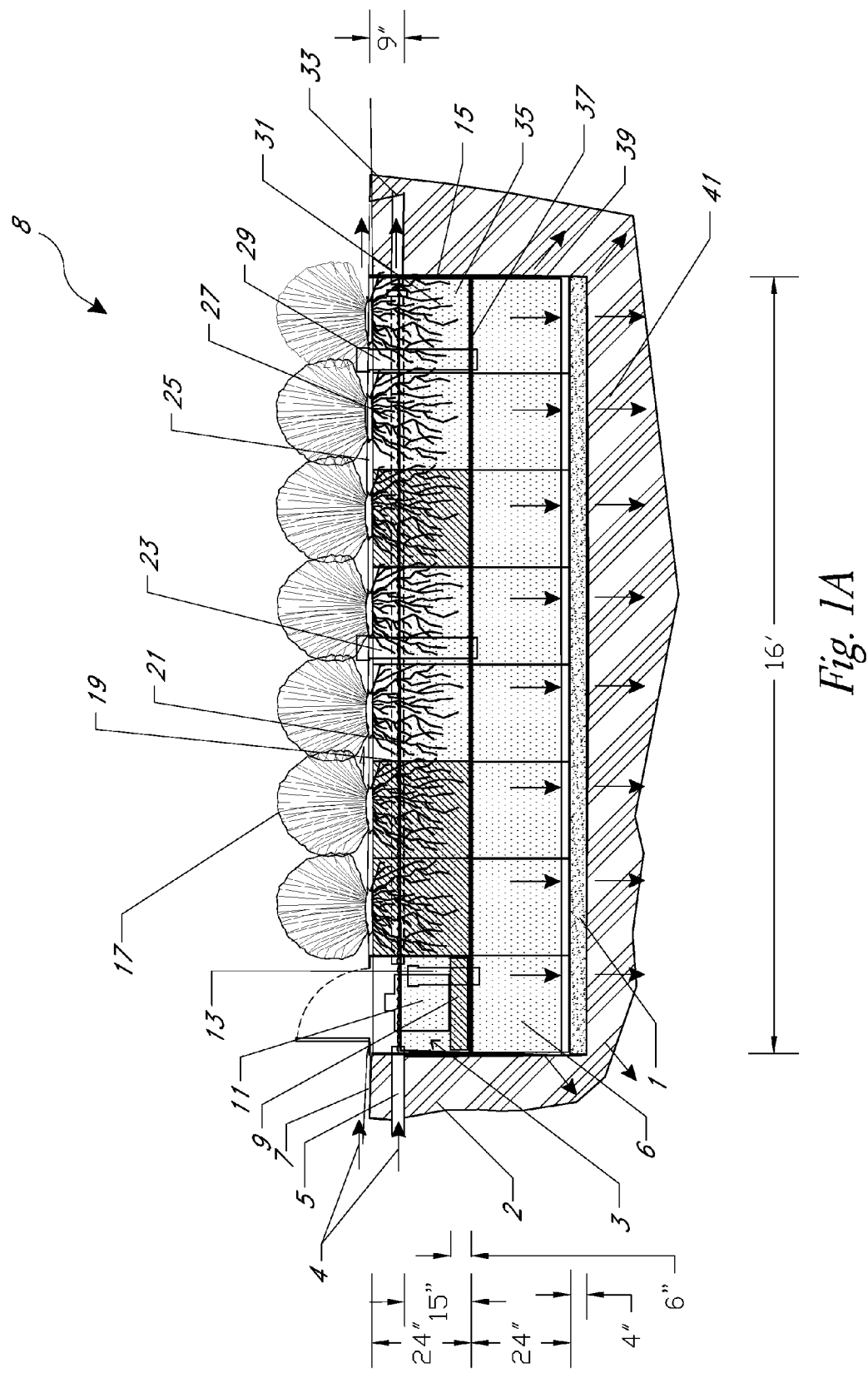
FIG. 1A shows a partially segmented side view of a water gravity filtration system installed into the ground as a "high performance bioswale" or "HPB" according to one embodiment.

These and other features, aspects, and advantages of the present disclosure will now be described with reference to the drawings of embodiments, which embodiments are intended to illustrate and not to limit the disclosure, as are described in varying degrees of detail below.

DETAILED DESCRIPTION OF THE PREFERRED EMBODIMENT

Among other aspects of the present disclosure, certain engineered high performance bioswale solutions are described to efficiently treat, such as filter, water run-off from landscapes and other sources.

Many alternative embodiments of the present aspects may be appropriate and are contemplated, including as described in these detailed embodiments, though also including alternatives that may not be expressly shown or described herein but as obvious variants or obviously contemplated according to one of ordinary skill based on reviewing the totality of this disclosure in combination with other available information. For example, it is contemplated that features shown and described with respect to one or more particular embodiments may also be included in combination with another embodiment even though not expressly shown and described in that specific combination.

For purpose of efficiency, reference numbers may be repeated between the Figures where they are intended to represent similar features between otherwise varied embodiments, though those features may also incorporate certain differences between embodiments if and to the extent specified as such or otherwise apparent to one of ordinary skill (such as differences clearly shown between them in the respective Figures).

FIG. 1 shows a water gravity filtration system (8) installed into the ground as a "high performance bioswale" or "HPB" via a series of modular stacked pairs of top filtration and bottom cistern containers as follows.

A recess dug or otherwise formed in the ground, with sand base (1) at the bottom of the recess, which may be for example about 4 inches deep, and surrounded by native soil (2) other than the open top of the ground recess or well (other than the further feature components described below). This sand base (1) provides a role of leveling the HPB when installed in the recess well in the ground. One or more inflow pipes (5) are provided via the system (two of them in the one exemplary embodiment shown), and may be for example about 4" in diameter, and are coupled into the top row of the first pair of stacked containers, to convey water run-off from another location into the HPB. The HPB is inserted into an area of additional surrounding bioswale ground surface (7), to accommodate water run-off into the HPB. Native water inflow (4), such as for example storm water, is conveyed into the HPB via inflow pipe (5) and/or adjacent ground surface (7), which may be for example an adjacent bioswale or graded surface to direct flow to the HPB, and becomes treated storm water (6) via the HPB of the present disclosure.

The first top container of the first stacked container pair comprises a unique desiltation container (3) relative to other stacked container pairs of the system. Desiltation container (3) allows the initial water inflow (4) into the system from inflow pipes (5) or surface (7) to fill the container, with silt settling to the bottom, prior to flowing over into outflow pipes (described below) to convey the desilted water into the tops of the stacked filtration container pairs along the remainder of the HPB. This desiltation container (3) also provides for monitoring and potentially desilting (e.g. vacuum aspiration) filtered or treated storm water (6) contained in the bottom cistern containers.

Media filter pillows (9) sit on the bottom of the top filtration container of the first stacked container pair, and over perforations in the bottom of the top container (not shown), to provide some filtration to water spilled into the bottom cistern of the stacked pair from that first pretreatment pair. A pretreatment filter (11) (such as for example a cylindrical filter model flogard perk filter #PF1812, commercially available from Kristar) is located in the top container of the first pre-treatment pair.

Water sampling portal (13) is a tube into the top filtration container of the first pre-treatment pair and into the bottom cistern container of the pair, for aspirating the filtered water such as for monitoring, testing, desiltation, or other purposes.

A series of filtration "modules" which comprise stacked pairs of top filtration and bottom cistern containers, each pair comprising a water gravity filtration and collection assembly, is provided as follows. A cradle (15), which may be for example hard plastic or other structurally robust and strong material (such for example a "CUDO®" cube, commercially available from Kristar), contains a filtration media (35) which is characterized to filter certain constituents from water percolating through the media. Cradle (15) has a perforated bottom (37) for the top filtration containers, allowing filtered water via the filtration media (35) to drain from the filtration container with gravity into the bottom cistern container.

Additional cradles are also provided for the bottom cistern container (39), and may be similar as provided for the top container, but may have certain differences related to different function of the bottom cistern container purposes. In one regard, the bottom cradles (39) may have a solid bottom, where water flow is desired to be contained or managed/directed to a specific direction or path, but may also be perforated if downward water run-off from the system is desired into the ground that comprises the well or recess bottom (41) below the cisterns (39) and into the aquifer such as is shown in FIG. 1. The side walls of the bottom cisterns (39) may generally be solid to contain the filtered storm water for controlled delivery in a pre-determined path (e.g. outflow pipe), or may be perforated or porous to allow water to leach through the walls into surrounding ground (as shown in FIG. 1 example); and may also be perforated in parts and solid in other parts to control the directional path of water flow out from the cistern containers. For example, the outer side walls of the cisterns of those modules that comprise the other perimeter of the overall system of modules may be solid or substantially impermeable to water flow relative to the inner walls of the bottom cisterns that comprise interfaces between adjacent cisterns of the assembled modules. This arrangement allows for filtered water to flow between cisterns, but while still being contained within the other perimeter walls of the system. The bottoms of all or a sub-set of the bottom cisterns can be permeable to thus allow gravity water flow downward from the system. Alternatively or in combination, only certain locations along the collective walls (or bottoms) of the bottom cisterns may be made permeable, with other wall surfaces relatively impermeable, as would be customized by one of ordinary skill to control the collection and direction of water flow from the system into or from the surrounding environment (e.g. ground soil).

Hyperaccumulators (17) comprising certain specific types of hyperaccumulating plants are planted and grow from the top of the top filtration containers of the stacked pairs. These plants (17) may be chosen to target filtration of certain types of pollutants in the water to be treated, such as for example at a rate of up to about 10 times the rate of recovery of typical soil alone. Examples of such hyperaccumulators (17) include, for illustration of certain particular exemplary embodiments, common bent grass and sunflower (which remove arsenic and manganese for the sunflower).

Media cartridges (31), such as for example which may be bags of loose media (35), fill the top filtration containers of the stacked pair modules. The media (35) of these cartridges (31) include filtration substances which filter certain materials desired to be removed from water. Bottom cistern containers (39) are provided below the top filtration containers as subterranean detention tanks. These may be wrapped in filter cloth in further embodiments. In addition, the root system of plants (17) grow into the filtration media (35), providing a multi-functional filtration system via the plant root system and filtration media. The root system conveys metals and other constituents to the shoots of the plants, which can be harvested such as for example for composting.

Distribution conduit (19), which may be for example about 4" in diameter, conveys storm water from the desiltation container and across the top filtration containers of the remaining stacked pairs of the system. This may be for example one or more pipes that is/are perforated on the bottom aspect of the pipe along its length, with the perforations registered with the open tops of the top filtration containers to confine the dumping of the storm water in principally these locations atop the gravity filtration and cistern container pairs.

According to one further example for illustration, distribution conduit (19) may comprise a "multi-flow" pipe conduit system that is relatively flexible, and may be for example about 1 inch thick, and comprise multiple individual perforated pipes in a bundle (e.g. 4, 6, 8, or 12, or other number, for example) and wrapped in an outer liner, which may be for example a porous fabric. This may be of the type, for example, which may be purchased or otherwise provided in a reel or roll, and rolled out to desired length across the top of the modules of the filtration system (such as for example across top of rock mulch provided over the filtration media of the modules). This allows custom fitting of the distribution conduit (19) to custom scalable filtration module-based assembly to accommodate different intended environments of use. This also allows ease of removal of the distribution conduit for servicing the HPB, e.g. to remove the "wetland in a bag" or "WIB" cartridge assemblies (comprising the vegetation and filtration media) from the top cisterns and replace with fresh cartridges.

Storm water (4) enters the top filtration containers via the inflow pipe (5) or ground surface (7) and is distributed to the filtration modules via the distribution conduit (19) and which extends to the last module of the assembly, e.g. via extension (27) of the conduit where it will typically be capped. The porosity of the conduit (19,27) allows the water to percolate downward through the filtration media (35) within the top filtration container. However, the water level may rise within that top filtration container if the flow downward into the paired lower cistern container is not on pace with inflow of the storm water into the top of the top filtration container. In the case of rising storm water reaching the level (21) of the distribution pipe (19,27), this may hinder or even prevent further inflow into the top filtration container from the inflow pipe, in which case further water inflow is conveyed away to the next module or beyond (see below). In general, one embodiment configures the top filtration container to expose storm water to 15 minutes of dwell time in the filter media (35), and which may represent a particular height/depth of the media (35), for example about 15 inches, or in inch per minute of dwell time in the filter media, in one particular embodiment (such as exemplified in the embodiment shown). The actual dwell time, height of media, etc. will depend on the filtration media characteristics as matched to the filtration objectives to suit a given need/implementation and environment of use.

One or more observation ports (23,29) are also provided, such as for example via pipes or tubes. While these are not necessarily required, they provide the benefit of allowing inspection (and potentially intervention, e.g. cleaning or aspiration) of the lower cistern containers of the modular system. These may be provided at only one module location, or each stacked container pair module, or intermittently along the overall chain of adjacent modular container pairs.

An additional top media layer (25), which may be for example gravel mulch, and which also may be for example about 2" deep, may also be provided over the HPB modules. This provides a catch and filter for direct water inflow, as well as holding things down, and providing some look of aesthetic continuity along the HPB modules in the ground. A discharge overflow pipe (31) conveys water away from the HPB assembly without gravity percolation through the top filtration containers when those containers are sufficiently full to prevent the water from exiting the pipe and into the filtration container. This may be a different pipe as distribution conduit (19), such as when conduit (19) is capped in the last filtration module to force inflow through the conduit to exit principally through the porous pipe sides along the length over the filtration media. Or the pipe (31) may be the same pipe as discharge pipe (19). In either case, this is beneficial in providing an outflow conduit in the case of "back up" of fluid flow through the filtration system, vs. backing the storm water flow up into the inputs, which could result in flooding. This continues via outflow conduit or pipe (33) away from the HPB, which may be the same or an interfacing pipe with pipe (31). This conveyed outflow through pipe (33) may be for example to an additional HPB or other destination, which may be for example another form of water treatment or storage apparatus or facility, storm drain inlet, etc.

In one embodiment, filtered water (6) in the bottom cistern containers (39) may be conveyed therefrom and into the aquifer, such as through perforations in the wall and/or bottom of the bottom cistern containers (39), which may be for example at a rate of about 0.5" per hour (depending of course on the accepting percolation rate of the soil itself).

Figure 1B:
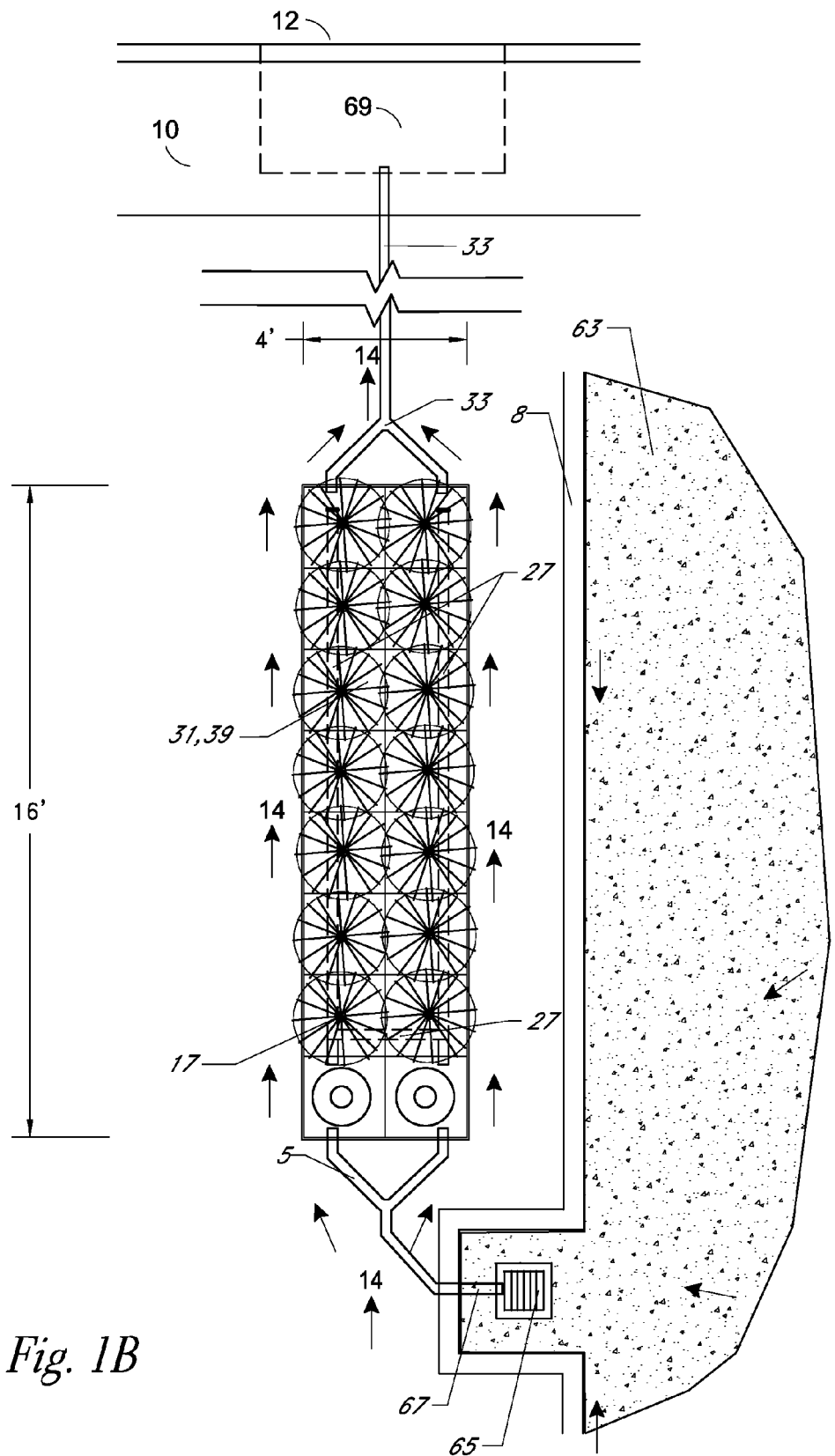
FIG. 1B shows a top plan view of a water gravity filtration system according to a present embodiment similar to that shown in FIG. 1A, in situ installed in one environment of use according to one further example embodiment.

FIG. 1B shows a top plan view of the HPB system (8) shown in FIG. 1, as installed in-situ adjacent a concrete sidewalk (10) and street (12), and concrete curb (8) along run-off surface (63), which may be for example a non-permeable concrete and/or asphaltic paving (e.g. parking lot for example), and located relative to one or more bioswales (14) or other surrounding land. A concrete catch basin (65) is provided to catch a substantial portion of the water run-off from the surface (63), and convey it to the HPB (8) via pipe (67) which may be for example about 6 inches in diameter. Pipe (67) bifurcates into two inflow pipes (5) which feed two adjacent pairs of vertically stacked module pairs, which are shown in series of 7 adjacent pairs of such vertically stacked module pairs along the length for this particular illustrated example (plus one initial pre-treatment adjacent pair of vertically stacked modules). A similar bifurcated coupling exits the ends of these two adjacent lines of stacked filtration/storage pairs, which then merge to form exit pipe (33) which conveys the treated water to storm drain inlet (69). For purpose of illustration of the overall functionality of this in situ installed system (8) in this environment of use shown in FIG. 1B, flow arrows (14) illustrate the general direction of water flow through the system from the inflow end to the outflow end, obviously not showing the vertical gravity filtration flow down through the filtration modules along the path of the modular HPB via the top plan view shown.

To further demonstrate for a full understanding, in one particular example, run-off surface (63) may be about 2,500 square feet. One example for an HPB will process approximately 2,500 gallons per hour of storm water or ¾ inch storm water from 5,000 SF of non-permeable paving. Filtration media according to one example of the present embodiment may generally have about 1 inch infiltration per minute (or about 60 inches per hour) to allow about 15 minutes of residence time in about 15 inches of media for untreated storm water to become "treated" (e.g. filtered).

There are numerous uses contemplated, and needs met, by the present embodiments—including but not limited as provided here by way of example, and as would otherwise be apparent to one of ordinary skill. For example, the Orange County Water Quality Management Plan (Orange County, California, USA) requires that for any new or redevelopment projects over 5,000 square feet must comply with the WQMP. This WQMP states that water run-off must meet certain specifications. This HPB of the current embodiments can be scaled, as it is modular. It can be for example doubled, halved, or put in other proportions to suit specific needs in particular environments of intended use, and may accommodate certain volumes at one general location, or separate locations along a site. It can also be modified for treating greywater or used in conjunction with above ground HPBS to increase filtration, re-use, or bio-treatment.

Figure 1C:
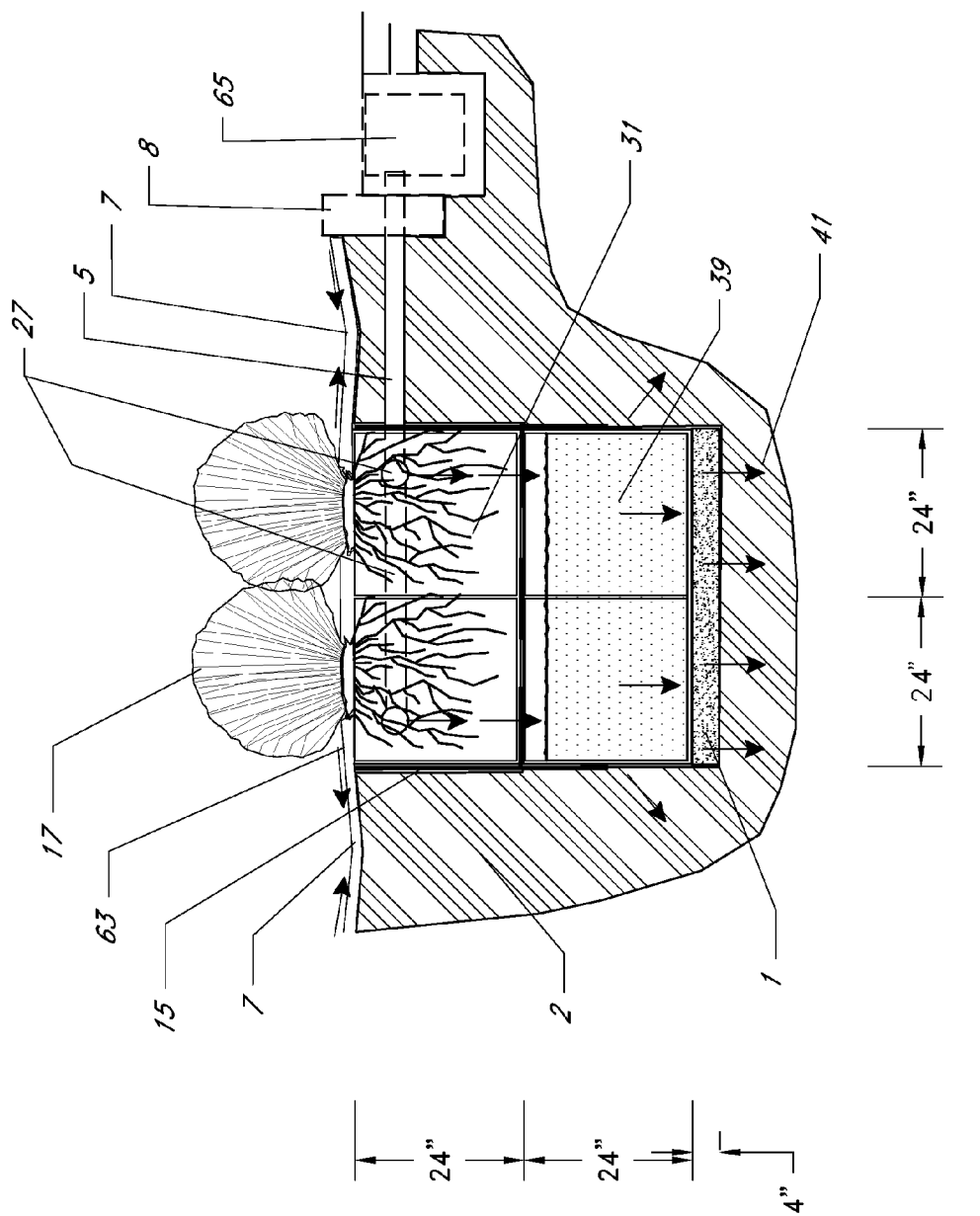
FIG. 1C shows a partially transversely segmented end view of a water gravity filtration system also according to a similar embodiment to that shown in FIGS. 1A-B.

FIG. 1C shows a cross-sectioned end-view of the same HPB embodiment shown in FIGS. 1A-B, and shows the concrete catch basin (65) in shadow.

Figure 2:
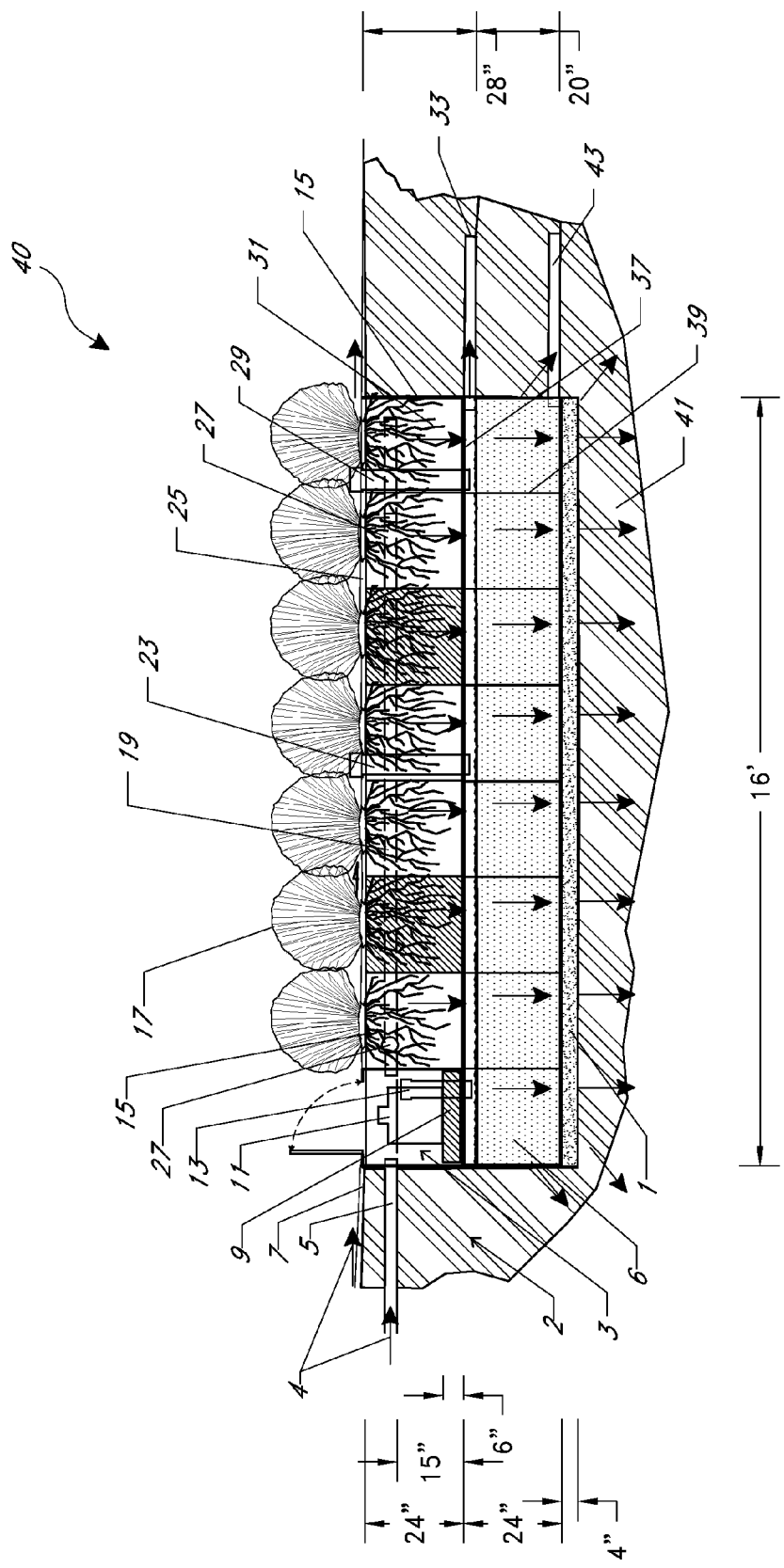
FIG. 2 shows a partially segmented side view of another water gravity filtration system installed into the ground according to another present HPB embodiment.

FIG. 2 shows a similar water gravity filtration system (40) as shown in FIG. 1, but according to additional embodiments related to managing outflow of water from the bottom cistern containers (39). According to these embodiments, outflow pipes (33) and (43) are shown at two alternate location in the bottom cistern containers and convey the filtered water therefrom and away from the filtration system to another site, such as for example to an additional HPB or other destination, which may be for example another form of water treatment or storage apparatus or facility, storm drain inlet, etc. According to one of these embodiments, top outflow pipe (33) is provided at the top aspect of the bottom cistern in order to convey water away from the bottom cistern containers when they fill, thus preventing continued filling from backing up into the top filtration containers. This may be desired where filtration through the bottom cistern container walls is provided into the surrounding ground and downward into the aquifer, but as a relief mechanism when that inflow rate into the cisterns exceed the surrounding filtration rate out of the cisterns through its walls. In another of these embodiments, bottom outflow pipe (43) is provided at the bottom aspect of the bottom cistern containers (39) to remove cistern contents, which may be deployed for example instead of allowing water drainage downward into the ground aquifer (e.g. where such leakage from the cisterns directly into the ground is not provided, such as for example where there is no porosity or perforations in the walls or container system in the ground well).

Figure 3:
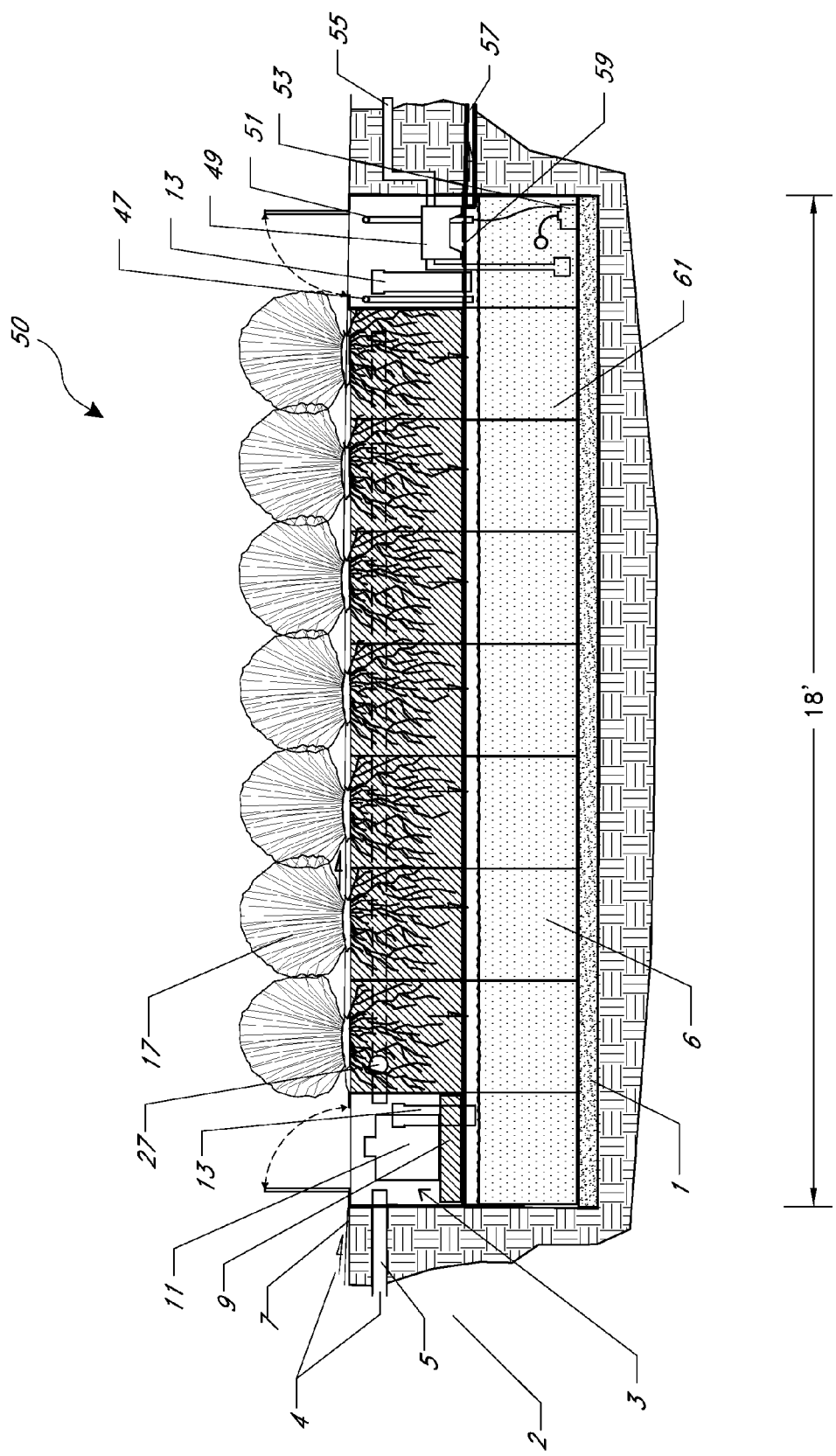
FIG. 3 shows a partially segmented side view of yet another water gravity filtration system installed into the ground according to yet another present HPB embodiment.

FIG. 3 shows a cross-sectional side view of another HPB system (50) per another embodiment similar to the prior embodiments of FIG. 2, but with the end of the series of stacked filtration modules followed by a second reservoir and outflow pipes (55) conveying treated greywater (6) away from the bottom cistern containers (61) which are otherwise enclosed to contain greywater (6) without leaking directly into surrounding ground soil. One example of this such as according to the particular exemplary embodiment shown can store up to about 940 or 1000 gallons of treated grey water.

A water sampling portal (13) is also provided, similarly as previously provided in FIG. 1 (though in the last container pair). Disinfectant application may be provided via this portal, if required. Water inflows may be same as in prior embodiments, but in this particular embodiment is considered particularly beneficial for treating and reclaimed use of greywater (6).

Potable water refill pipe (47) provides a conduit for introducing potable water into the greywater of the bottom cistern containers in order to dilute any contaminants otherwise found in that treated grey water, such as may be required in order to reach a certain level of desired cleanness or purity (or conversely desired levels/concentrations of contaminants). This may also simply provide another source of water for the pumping, in the event the filtered water path via the top filtration containers of the HPB is not sufficient. It is to be appreciated that the various portals provided in the illustrated embodiment may be further separated into more portals with individual functional roles, or conversely the multiple portals combined may be combined into one portal with increased functional uses. E.g. portals (47) and (13) may be combined into one conduit, serving the multiple functions at different times as represented by the individual portals of the illustration.

An irrigation pump (49) is provided to pump the treated grey water out of the HPB system and convey it elsewhere, such as for example into an irrigation system (e.g. drip line or otherwise). An electrical portal (51) may be provided in order to power such a pump, and which may include certain float/s and/or controls for feedback control capability.

A refill float (53) automatically senses the water level in the bottom cistern container (61) associated with the stacked pair with the irrigation pump. When treated grey water (6) level goes too low to keep the water pump "wet," this may trigger the need for refilling with added potable water refill, such as via refill pipe (47). An outflow pipe (55), which may be for example about 1 inch in diameter, is provided as mainline outflow to remote destination, such as for example drip irrigation system. One or more, and in the illustrated embodiment two, overflow pipes (57) convey overflow to storm drainage system, and may be for example about 3 inches in diameter. A desiltation port (59) may also be provided in this embodiment, and may be for example about 12-18 inches in diameter. The cistern containers of this embodiment comprise subterranean retention tanks (61) which are generally non-permeable to water leaking into surrounding ground soil, and/or may be wrapped in non-permeable material, such as for example polyvinyl plastic.

Many water inflow sources, including for example many different grey water sources, are contemplated for use with the present embodiment, such as for example restroom sinks, laundry, cooling manufacturing processes, AC condensation, and some wash down processes. Many water re-use sources are also contemplated, including for example but not limited to roof top storm water harvesting, wash down processes, storm water from streets, parking lots, other surfaces or paving.

Various materials and geometries may be chosen which would impact capacity, flow rates, and other specific performance measures of HPBs of this and other embodiments. However, one particular embodiment, provided for purpose of further illustration and understanding, contemplates a daily capacity of about 940 gallons of treated greywater, which would provide enough irrigation for about 22,000 square feet (or ½ acre) of land (e.g. drought tolerant landscape).

FIGS. 4A-H show schematic plan views of various specific embodiments of another aspect of this disclosure, wherein a flowing water filtration system (30), such as a high performance bioswale (HPB), is provided and comprises a filtration assembly (200) with extended barrier walls (85). Extended barrier walls (85) are configured as generally non-permeable and provide one or more benefits, including for example but not limited to: as an erosion barrier to prevent water from flowing into area (28) behind the walls and aside from the filtration assembly (200), and which area (28) may include for example a backfill (which may be for example sand, either alone or in combination with other backfill material); and/or as flow diverters for directing water inflow (24) of a flowing waterway substantially into filtration assembly (200) in order to filter the water exiting the system (30) downstream via water outflow (26). In the particularly beneficial angled configurations shown, per relatively oriented angles between respective walls (85), this configuration provides for a funneling effect of water inflow (24) into filtration assembly (200).

According to another particular variation shown, removable non-permeable side panels (83) are removably secured relative to one or more sides of the filtration assembly (200). Without the side panels (83), the filtration assembly (200) is otherwise permeable to water flow through its perimeter. Accordingly, by strategic placement of the non-permeable side panels (83) at certain locations along that periphery, but not at others, flow into and out from the filtration assembly (200) may be strategically directed. This provides for customization of such directional flow for a given site and need, and/or variability in that customized flow path as the needs may change at a particular site (or for a particular physical system, which may be relocated and reused at different sites with different directional flow requirements or needs).

The filtration assembly (200) according to this aspect of the disclosure may comprise one or more various different specific materials and structures sufficient to perform the filtering role contemplated. For example, it may comprise a simple filter material (either solid or loose contained), a more complex filter media comprising multiple different components (such as for example a complex biomedia), or a mix between or discrete layers of different types of filtering media (and each of which may perform additive or different contributing functions to the filtration process, such as to remove different constituents from the filtered water). It may be either active (e.g. mechanical or other applied means to achieve filtration, e.g. light, chemical, etc.), or passive (e.g. water contact through the material provides the filtration).

The filtration assembly (200) may also comprise a structural container which houses a filtration media, such as with walls that are either designed to be permeable to water flow or relatively non-permeable to prevent flow therethrough—again such that flow into and out from the structure may be directed in a desired path. Accordingly, non-permeable side-panels (83) may be integral to the filtration assembly (200) structure, such as at the various locations shown among alternative embodiments of FIGS. 4A-G, or may be attached, secured, or positioned adjacent thereto, also such as these locations; e.g. where, for example, all side walls of the assembly structure may be permeable and the attached side panels (83) provide the containment where desired. This approach allows adjustability for water directionality through the filtration system by adjusting the location of the panels (83) and without the need to adjust the installed system modules themselves.

The filtration assembly (200) may also comprise a single unit or chamber containing such media (not shown), or multiple individual chambers as cartridges or "modules" provided in an array with a footprint across the filtration assembly (200), as shown in various more specific modular configurations in FIGS. 4A-H. According to one specific illustrative embodiment, FIG. 4A shows a single row (202) of filter modules (204) aligned in series in the direction of flow. According to another shown in FIG. 4B, there are two such rows (202) adjacent to each other for a 2×4 array of 8 modules (204). FIGS. 4C and 4D show a 3×3 array of 9 modules (204), and 3×4 array of 12 modules (204), respectively, for further illustration. Each of these embodiments of FIG. 4A-D show relative positioning of the non-permeable side walls (83) on one pair of opposite sides of the filtration assembly (200) transverse to the direction of water inflow/outflow (24,26) through the assembly (200), with permeability between the modules along the flow path within the assembly, thus containing the water flow through that directional path through the filtration media of the modules until the water exits as outflow (26). Where there are multiple adjacent rows (202) of modules (204), such as in FIG. 4B-D, the side walls between modules may be permeable, to allow free flow of water across the media of all modules that is otherwise contained at the outer peripheral sides of the overall assembly, or may be non-permeable, to confine water flow path within the assembly to remain longitudinally down each row (202) individually.

These configurations illustrated and described above by reference to FIGS. 4A-D may be further modified, as further illustrated for example in FIGS. 4E-G. In one specific example, FIG. 4E shows the same structural filtration system (30) shown in FIG. 4A, though rotated 90 degrees relative to the water flow path such that the row (202) of filtration modules (204) is oriented transverse to that flow path. This widens the footprint of the filtration assembly across a wider flow path, but while shortening the longitudinal flow path of the water from traversing four modules aligned in their row with the flow path (e.g. FIG. 4A), to only instead traversing one module (204) of the transversely aligned row (202) (e.g. FIG. 4E). Accordingly, in the FIG. 4E embodiment water flowing through that configuration as shown experiences less filtration media (one module of media) than provided in the flow path of the FIG. 4A embodiment (four modules of media). A similarly rotated configuration of the embodiment shown in FIG. 4B is shown in FIG. 4F, which re-orients the 2 row×4 module array into a 4 row by 2 module array—both providing 8 modules in the same overall architecture (other than the location of the non-permeable side walls), but with different footprint and filtration functionality relative to water inflow/outflow and to accommodate different intended environments of use. FIGS. 4G and 4H further illustrate the scalability of the current embodiments, which essentially double the row:module arrays of FIGS. 4C and 4D and between the extended barrier walls (85) at the corners of the respective filtration assemblies (200).

Other modifications may be made to the illustrative embodiments shown in FIG. 4A-H, such as to accommodate certain specific intended environments of use, and while remaining within the broad scope of the various beneficial aspects disclosed and exemplified by the embodiments of the Figures. For example, while the illustrative embodiments shown in FIGS. 4A-H include four barrier walls (85) for each filtration system (30) shown, and in particular at each of four corners of the respective "box"-shaped filtration assemblies (200) shown, it is appreciated that, while this configuration is highly beneficial, other configurations may be provided. Such variations may include for example with respect to numbers, locations, shapes and/or dimensions (either actual or relative) of the barrier walls (85). For example, an adjacent pair of such barrier walls may be provided on one side of the HPB, but not on the opposite side, thus providing only one pair of only two such barrier walls. This may be sufficient, for example, where there is no or reduced concern about diverting flow at the side of the system where the barrier walls are not provided, such as if there might be natural barriers on that side adjacent the HPB, or if flow direction is less concerning at that location (e.g. outflow into a wider acceptable waterway exit immediately downstream of the HPB). Thus, any combination of 1, 2, 3, or even 4 such walls may be acceptable in order to accommodate a particular situation and need. In fact, even more walls than just those at the corners may be provided. Different filter assembly shapes having perhaps multiple inflow and/or outflow sources could be accommodated with more barrier walls to confine more flow pathways, for example. Or, according to another example, additional barrier walls may be arranged along the length of a side of the filtration assembly—such as affect cross-sectional distribution of water inflow into the filtration assembly along the length of the side. This for example may potentially prevent uneven flow distribution over the media bed, which uneven flow burden into an otherwise fixed filtration capacity could create an unevenly distributed functional life of the media across the system. This may also be provided in combination with non-permeable side walls between adjacent rows (202) of filter modules (204), in an overall configuration which directs flow path down each row (202) individually through the system (30).

Figure 5:
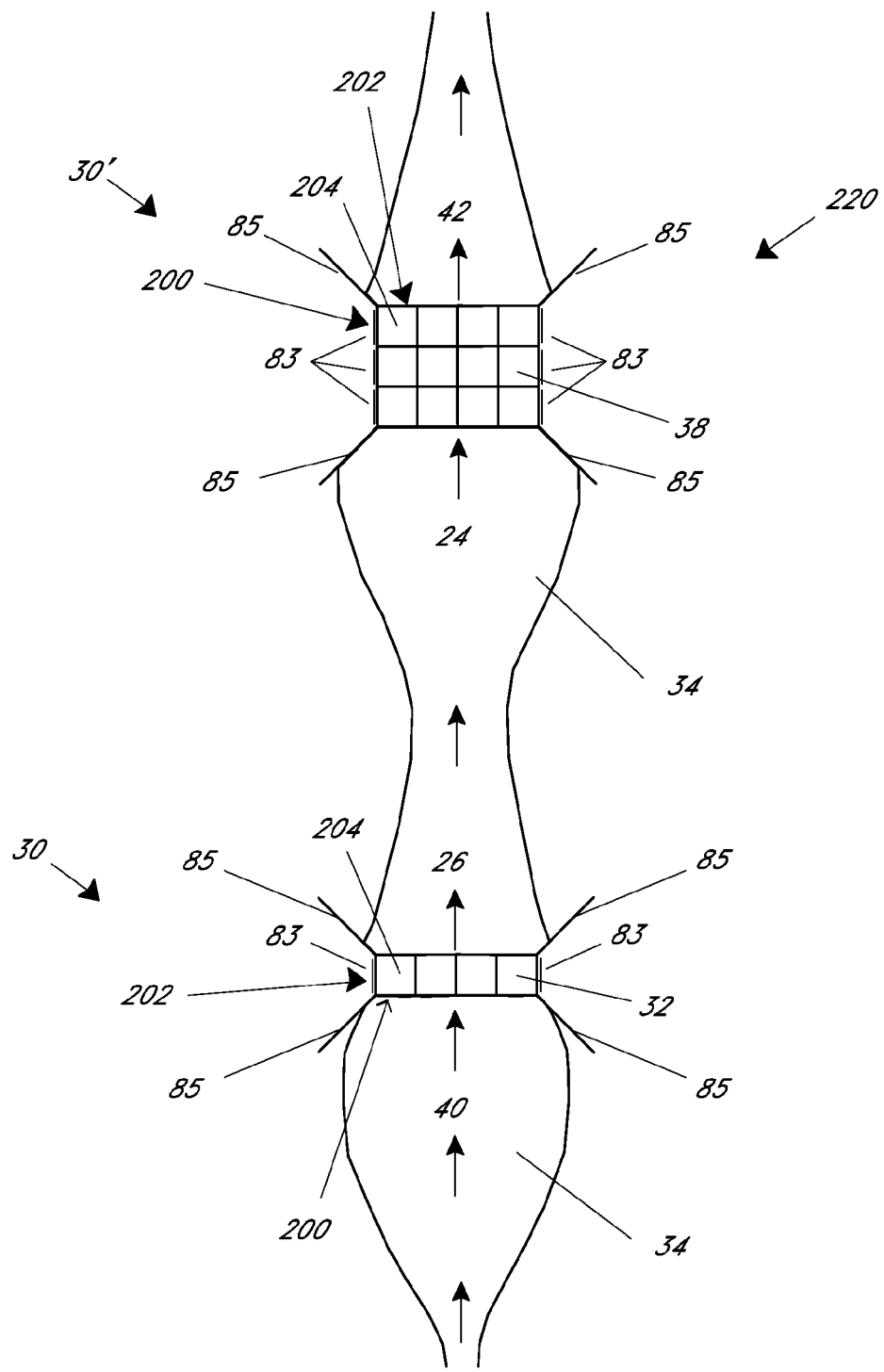
FIG. 5 shows a top plan schematic view of a water filtration system according to another embodiment, and shows first and second filtration assemblies in series along a water flow path.

FIG. 5 shows a schematic plan view of one waterway water filtration system (220) in situ in one illustrative environment of use according to another aspect of the present disclosure. More specifically, system (220) comprises a combination of each of two filtration systems similar to a couple of those shown and described above with respect to the embodiments of FIGS. 4A-G. A first filtration system (30) similar to that shown in FIG. 4E is located in the upstream location of the flow path of the waterway. A second filtration system (30') similar to that shown in FIG. 4C, though with 4 rows of 3 modules or 12 modules vs. 3×3 or 9 modules of the specific FIG. 4C embodiment shown, is located second in the flow path downstream of first filtration system (30) to provide a "polishing" filtration system (38). A first forebay (34) is located upstream of first filtration system (30) and providing influent (40) into the overall system (220). The first filtration system (30) provides a pre-filtration function to the outflow (26) therefrom. Outflow (26) enters a second forebay (34) above second filtration system (30') and below an optional waste in the waterway cross section immediately below first filtration system (30), and thus providing inflow (24) to the second filtration system (30'). Effluent (42) exits the second filtration system (30') and overall system (220), after being twice filtered by the first and second filtration systems (30,30').

This arrangement may be particularly beneficial for example where one filtration step may be beneficially conducted prior to another. While each serially positioned HPB assembly of filter modules (32,38), respectively, may include the same filtration media, they also may provide different filtration media serving different functions. This may provide a benefit, for example, to allow the first filtration system to remove certain pollutants, contaminants, or debris which might adversely affect the functionality of the second filtration system. For example, the first filtration system may catch larger particle debris which may otherwise clog the second filtration system (e.g. if it has finer porosity or permeability than the first). Or, either alternatively or in combination with the former, the contaminants removed by the first system might simply mask the target contaminants to be filtered by the second.

Figure 6:
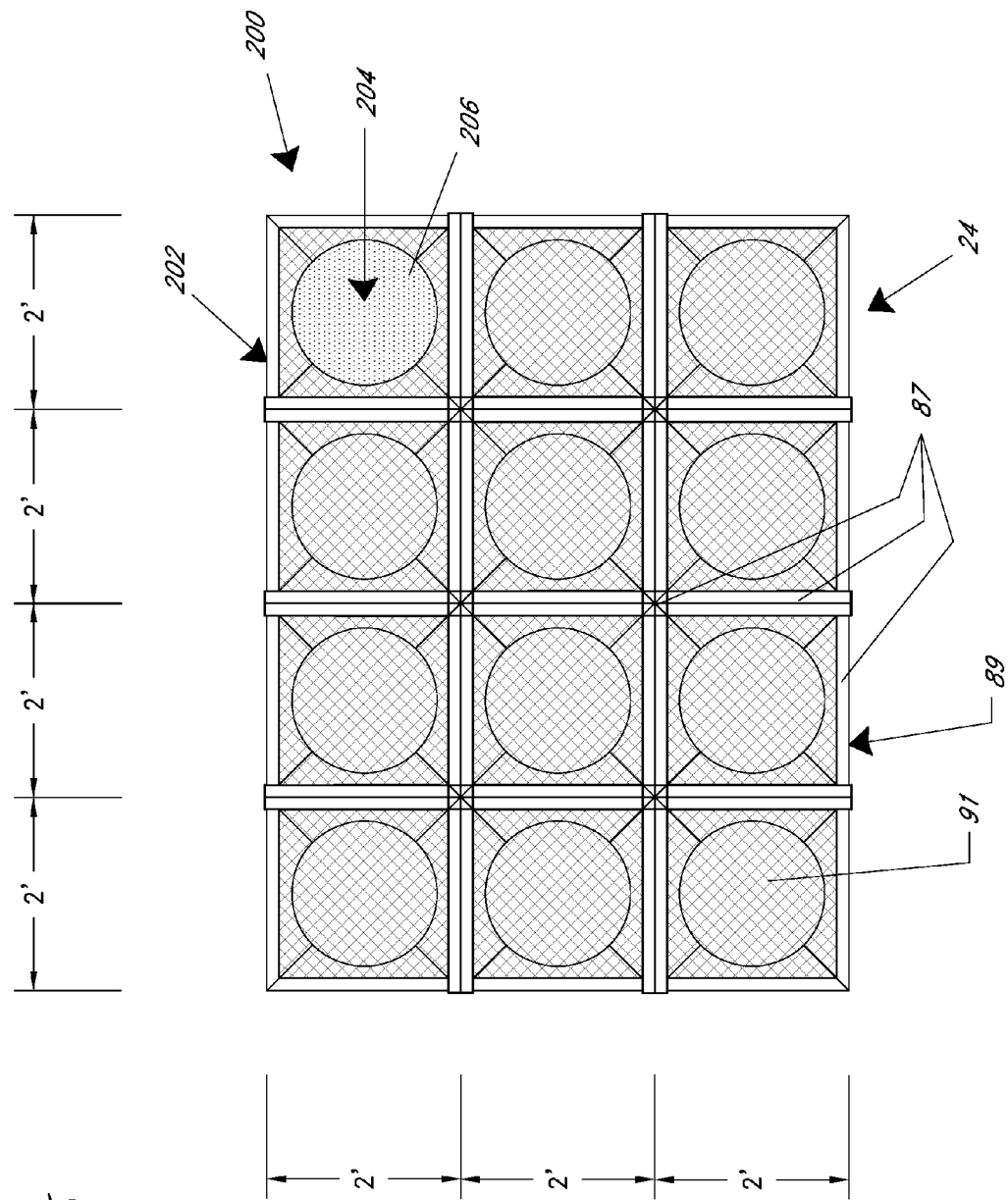
FIG. 6 shows a bottom plan view of certain finer details of another filtration assembly embodiment considered suitable for use as a component assembly in certain other embodiments shown and/or described herein, including for example with respect to one or more of the filtration assemblies shown and describe by reference to FIG. 5.

FIG. 6 shows a bottom plan view of certain finer details of one particular filtration assembly (200) considered suitable for use in certain embodiments shown in prior FIGS. and described above, in particular with respect to polishing HPB (38) shown and described above by reference to FIG. 5. More specifically, each of the 12 modules (204) in the 4 row (202)×3 module array, in the illustrative example shown, comprises a structural filter module container (89), which may be for example 2 feet on each side and available from Atlantis or "CUDO™" cube storm water tanks made of polypropylene (though other configurations and materials may be chosen). This container (89) contains a filtration media (206) within the space defined within its walls, which walls may be permeable or non-permeable depending on the location and desire for water flow. In the embodiment shown (and further reference to FIG. 5), the downstream facing walls of each filter module container (89) are permeable to water flow in direction of inflow (26) to allow water to flow through the filtration media (206). Lift straps (87) are also provided to allow one or more of the containers (89) to be removed from an in situ installation in its environment of intended use. In the specific embodiment shown, a high tensile strength material (91), such as for example a fabric, weave, and/or plastic membrane, and which is typically permeable (though may not be required to be permeable in all locations, mainly where water flow is desired to be maintained therethrough) is spread across or wrapped around the assembly (200) and attached to straps (87). While many specific arrangements of straps and wrappings may be suitable, it is to be appreciated that a configuration is generally provided which allows removal of the assembly (200) via the straps (87), although in other examples other mechanisms may be provided to engage the hardware for lifting or adjusting, such as for example handles, hooks, tethers, etc. This may be done for example if the intended use of the filtration assembly (200) is terminated, such as for example when water flow has ceased (e.g. between rainy seasons), or to replace the assembly (200) containing "spent" media due to use with a fresh assembly (200) containing fresh media (206).

Figure 7:
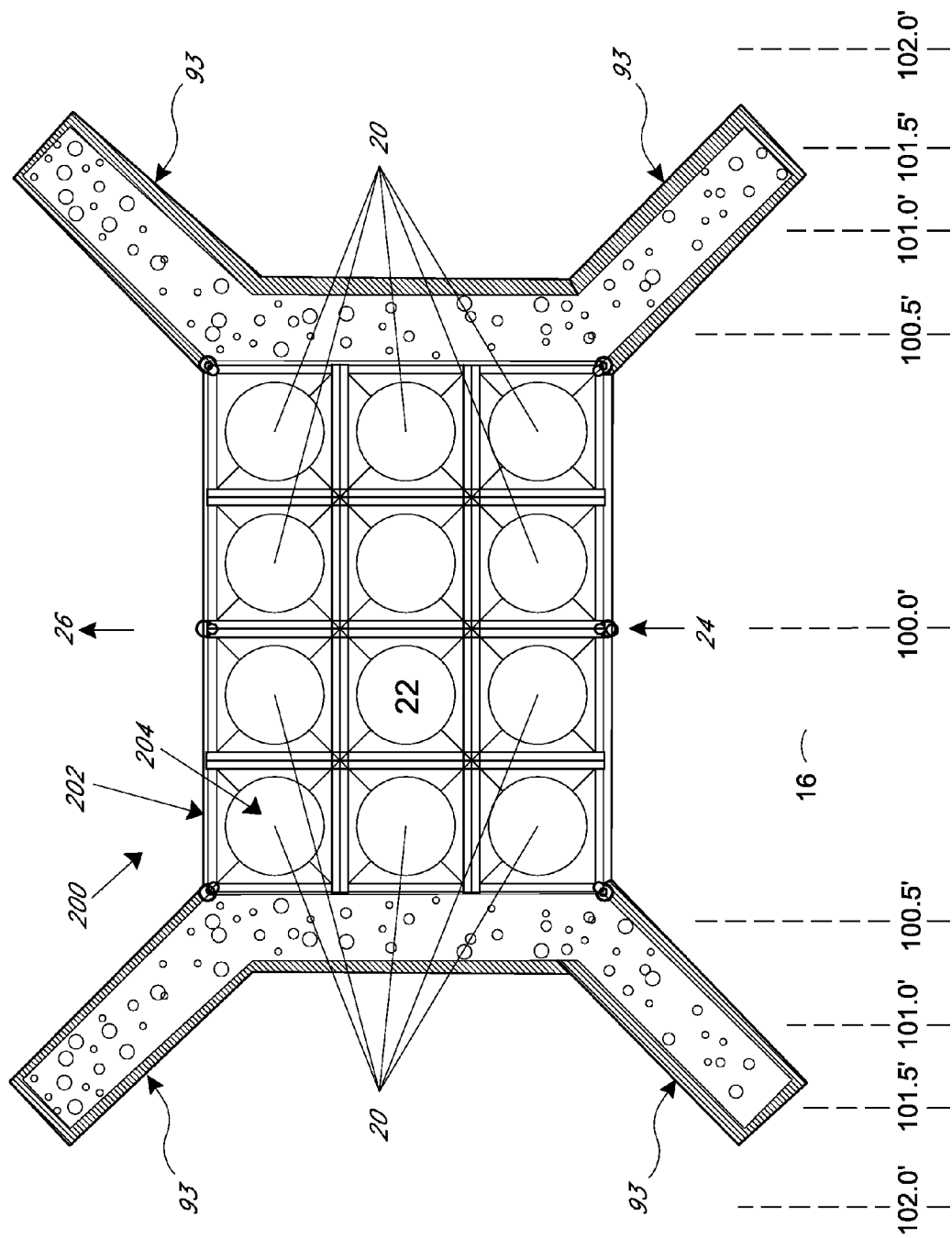
FIG. 7 shows a schematic plan view of another HPB filter assembly embodiment similar to that shown and described by reference to FIG. 6, but shown in situ in a "crib" configuration relative to a grass or ground swale.

FIG. 7 shows a schematic plan view of a HPB filter assembly (200) with rows (202) of filter modules (204) similar to that just described above by reference to FIG. 6, but shown in situ in a "crib" configuration relative to a grass swale (16). This may be provided with a certain degree of drainage via a sand drainage bed (95) (shown in FIG. 8, and for example about six inches deep) that facilitates drainage when the modules (204) of filter assembly (200) have permeable bottom walls and sit on top of the sand drainage bed (not all shown in the current perspective view, as it is underneath the filter assembly). Open tops (20) to the filter modules (204) allow media and/or plants growing into and/or from the media to be filled or removed from the modules, such as shown schematically at planted media (22) in one exemplary module. Flow directors or walls, which may be for example living retainer walls (93), are shown which provide the function similar to that previously described above with respect to barrier walls (85), and allow directed inflow (24) and outflow (26) relative to assembly (200). A mesh, geotextile, or other fabric or permeable or porous membrane or covering is provided over the filter modules (204) in order to allow water flow into the filter modules (204) but prevent certain size sediment and other particulate into the filtration system where it could clog.

Figure 8:
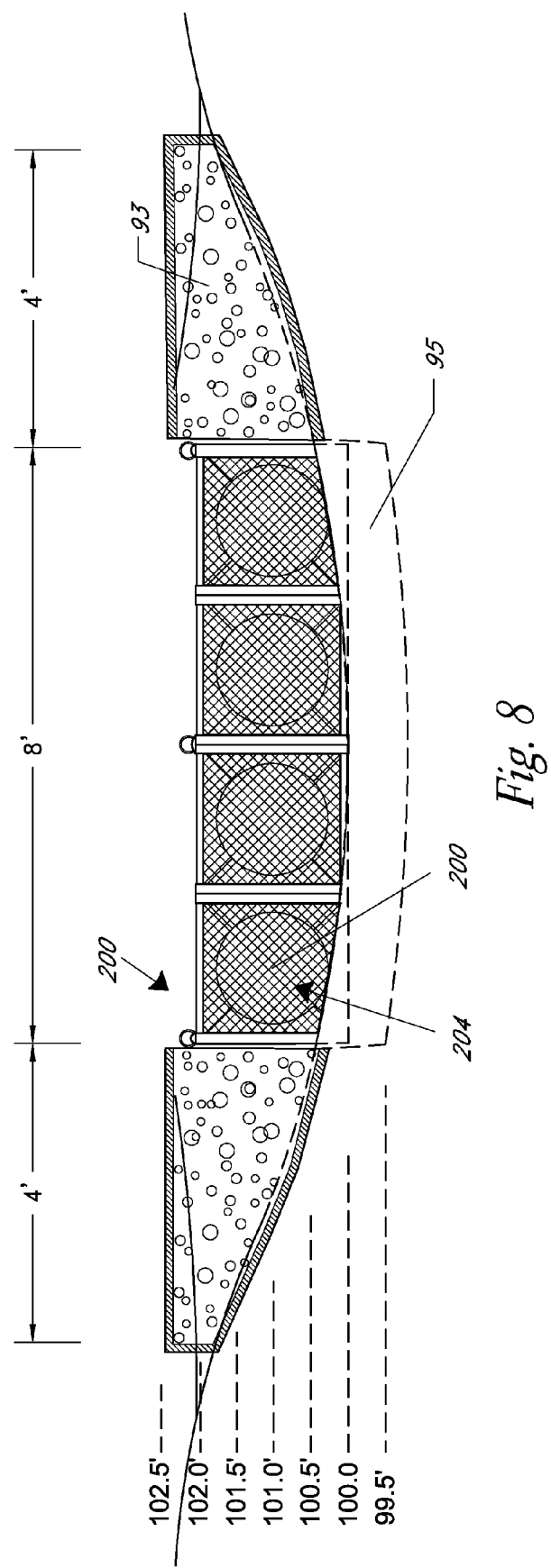
FIG. 8 shows an elevation front view of the inflow side of the HPB assembly shown in FIG. 7 and as installed relative to a sand drainage bed or basin in the crib configuration shown and described above by reference to FIG. 7.

FIG. 8 shows an elevation front view of the inflow side of the HPB assembly (200) and respectively positioned row/column array of filter modules (204) in the crib configuration shown and described above by reference to FIG. 7, and further shows a sand infiltration basin (95) that may be for example about 12 inches deep, and will often be provided in such a landscape solution, relative to living retaining walls (93).

Dashed lines accompanied by numerical references shown for example as X' (X=number) are provided in FIGS. 7 and 8 (in addition to other Figures herein shown and described) to illustrate elevation at the line location indicated, thus reflecting certain slopes between the dashed lines with different valued indicated. These numbers are generally represented as feet above a reference point, such as for example sea level, though are illustrative examples only and not necessarily required and thus not intended to be limiting to the embodiment shown. The embodiments of this disclosure are modular, scalable, and flexible in terms of their specific implementation to meet a given need in a given environment of use, and various different slopes or elevations of the ground swale, water way, or other in situ environment of use are contemplated.

Figure 9:
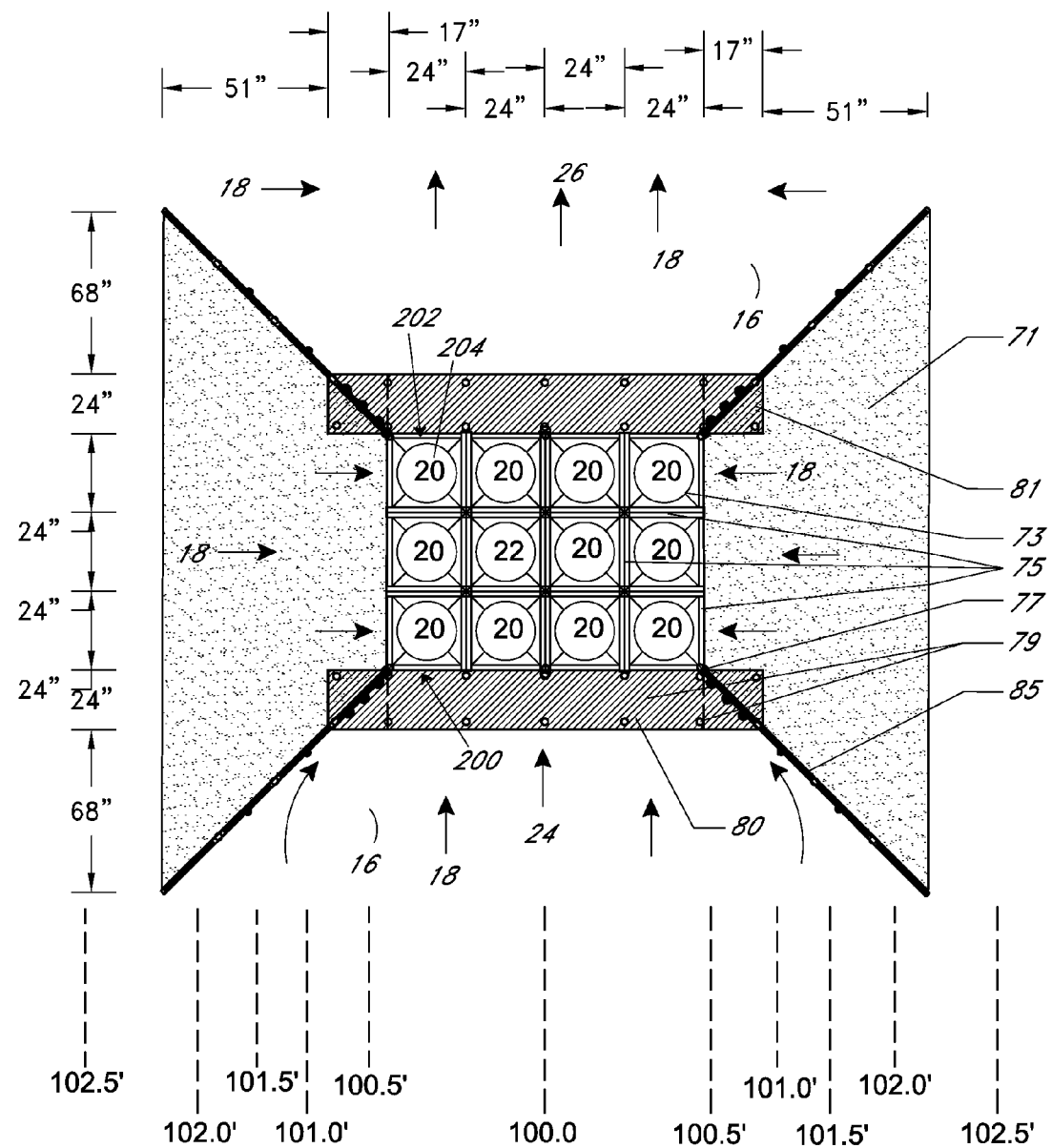
FIG. 9 shows a schematic plan view of an HPB incorporating a filtration assembly similar to that described above by reference to FIGS. 7 and 8, but as implemented in situ in a wetlands environment with a ground or grass swale that has a water drainage according to the flow profiles shown by way of reference arrows.

FIG. 9 shows a schematic plan view of a HPB incorporating a filtration assembly (200) similar to that described above by reference to FIGS. 7 and 8, but as implemented in situ in a wetlands environment with a grass swale (16) that has a water drainage (18) according to the flow profiles shown by way of reference arrows in the Figure. Open tops (20) of filter modules (204) provide for plant growth from media contents within the modules (204), as shown schematically for example at module (22). The assembly (200) provides a contained filtration path through the rows (202) of modules (204) in line with water inflow (24) and outflow (26) paths. In the particular illustrated embodiment shown, a backfill and base (71), which may be for example sand (which may be for example about 2.5 cubic yards for the particular example shown), is provided below the assembly (200) and aside it transverse to the inflow/outflow path laterally between adjacent side pairs of erosion control panels (85) that are similar to barrier walls (85) in prior Figures described above. An array of 4 rows (202), each of 3 modules (204), or 12 total modules (204) is shown, and may comprise for example similar containers (73) such as storm water tanks (e.g. polypropylene "CUDO™" cubes, for example) as previously described above. Lift straps (75) are coupled to lifting rings (77) to assist in manipulating the assembly (200) in and out of the installed location, as also described above. Erosion control panels (85) are provided as are bottom erosion control flaps (81) coupled with grommets (79) also provided. These are nailed into the ground to prevent water from undermining/eroding the front edge of the filter assembly, so that water does not undermine the unit and is forced into the filter modules rather than under them. As shown later in different end view of FIG. 11, stakes (103) and (105) are driven through the grommets to secure the bottom erosion control flaps to the ground.

Figure 10:
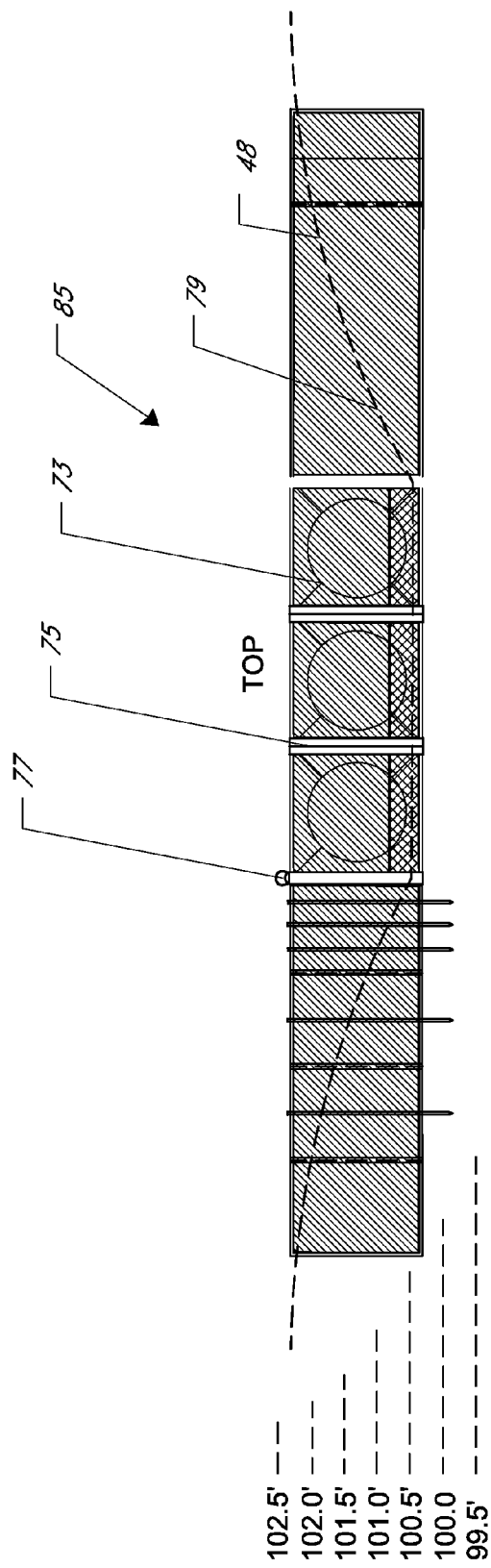
FIG. 10 shows a schematic elevation left side view and elevation outflow side of the HPB shown and described above by reference to FIG. 9, though not showing the sand backfill in order to reveal features of the side of the assembly.

FIG. 10 (& FIG. 11) shows a schematic elevation left side view and elevation outflow side of the HPB shown and described above by reference to FIG. 9, though not showing the sand backfill in order to reveal features of the side of the assembly. Finish grade (48) of the wetland grass swale is shown for reference to further illustrate the in situ configuration and environment of use according to this embodiment, including relative to erosion control flaps on the bottom of the assembly at (80,81), and vertical walls or wing flaps extending from the corners of the assembly to form funneled control of inflow (24) and outflow (26) relative to the filtration module assembly. By reference to these various views together (including also in particular FIG. 11), a bottom portion of the side walls shown for the row of modules at the side periphery of the assembly (e.g. bottom ¼ for example, as shown by different cross-hatching in FIG. 11) is permeable. The top portion (e.g. about ¾ in the embodiment shown by different cross-hatching) is relatively non-permeable. This accommodates the water flowing into the module from the sides and moving perpendicular to the path through the modules via inflow (24); in other words, this facilitates drainable moving down the swale and through the sand backfill into the filtration assembly. While flow down the primary path of inflow (24) may also leach out of the side filtration modules via this permeable bottom side wall portions, this will typically return via the grading with downward pressure into the filtration modules exceeds outward pressure from resident flow through the side periphery modules.

Figure 11:
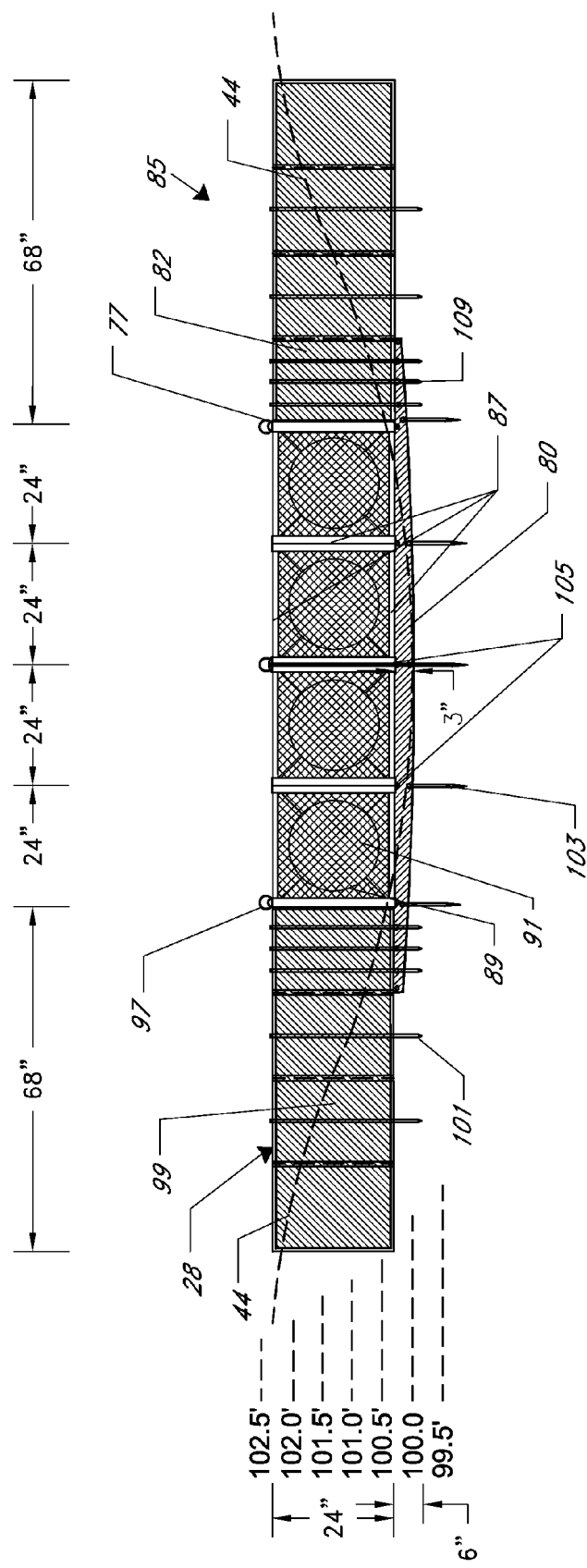
FIG. 11 shows a similar in situ water filtration system and assembly as that shown in FIGS. 9 and 10, but shows a schematic elevation view of front inflow side of the HPB.

FIG. 11 shows the same in situ system and assembly (200) shown in FIGS. 9 and 10, but shows schematic elevation view of front inflow side of the HPB. More specifically, sand backfill (28) is indicated, but not readily seen as located behind side erosion control walls or panels (85). The assembly (200) is shown as inserted into a varied slope grade (44) of the wetland bioswale. Erosion control panels (85) are also shown as deployed under the in situ installed configuration in the swale. Filter module containers (89) may be of the types previously described above, such as for example a cube (which may be for example 2 feet on each side), such as for example Atlantis or "CUDO™" cube of the type typically used as storm water tanks, such as may be made of polypropylene or other suitable structural material appropriate for the intended function and environment of use.

Lifting rings (77, 97) are also shown, used to assist together with lifting straps (87) engaged therewith to manipulate the assembly (200) into and out from the installed location. While location and number of such rings (77,97) may vary, in one exemplary embodiment there may be about six of them spaced around the top of the assembly (200), and in one example may be steel and about 4 inches in diameter, for example (or other sufficiently robust construction or securement mechanism to provide the intended functionality and purpose relative to the particular system to be manipulated). The straps (87) may be for example high tensile strength material, such as fabric, line, weave, or plastic, strapped around the corners, and possibly edges between and around container tanks. An additional high tensile strength material (91), such as for example a fabric, weave, and/or plastic or other material membrane, and which is typically permeable (though may not be required to be permeable in all locations, mainly where water flow is desirably passed therethrough) is spread across or wrapped around the assembly (200) and attached to straps (87). In one example, such coverings or wraps may be provided across the assembly as one piece, or in further examples may be multiple separate or attached pieces providing a suitable overall structure relative to the filtration module assembly deployed.

Right and left erosion control panels (85,99) are shown in their angular deployed configuration in situ. While the particular construction for such panels (85,99) may vary to suit a particular desire or intended use, to provide further illustration they may be constructed for example of non-permeable high tensile strength material, and may comprise shaped structural envelopes (such as for example woven plastic) with high strength boards inserted therein. This particular configuration allows for certain flexibility in use in varying requirements between shipping, process of deployment, and functional role once deployed in situ in the ground—as further described below.

A plurality of stakes (101) is also shown in vertical (or may be angled) orientation into the ground of the surrounding grade (44). These stakes (101) are mechanically engaged to erosion control panels (85,99) to secure the panels in the desired angular orientation relative to the inflow/outflow water path of the filtration assembly (200)—though it is also appreciated other forms of engagement or relative positioning may be implemented to achieve sufficient results intended. This engagement of the illustrative example of the current embodiment shown, according to one further example, may be through a fitted mating, e.g. through grommets or lumens of the panels themselves, or according to another example by placing the stakes (101) outside but adjacent to the panels in slightly alternating fashion on either side of the panels to assist in the mechanical securement (or may be simply placed on the downstream side of flow direction as an abutment against that unidirectional force of motion, if and when considered sufficient in a particular environment of use).

A particular example assembly of multiple such adjacent stakes (109), more specifically three of them as shown in this particular illustrative embodiment shown in FIG. 11, are provided in this illustrative example of the current embodiment closer together in the first panel flap closest to the modules. This configuration, though certainly not necessary or limiting, provides a benefit of higher strength at this location corresponding with higher flow and a transition zone in the overall flap assembly where it extends from the modules. The downstream side of the flaps, opposite the flow engagement side, may also be sand filled as a backstop against the pressures of the flow.

As with other features, such examples are not intended to limit the broad intended scope of the invention disclosed. Other modifications from such specific examples may be made by one of ordinary skill in order to accomplish the functional objective of such features and without departing from the broad scope contemplated for the present invention.

It is accordingly appreciated that erosion control flaps are provided in combination with a bioswale water filtration and/or treatment assembly to control flow along desired paths into and from the in situ deployed assembly, and more specifically in these current embodiments an assembly comprising an array of filtration modules.

A permeable or semi-permeable, high tensile strength (to extent of structural integrity intended for its respective function) liner or membrane (91) is also attached to straps, and may be for example a woven plastic membrane or liner. Additional bottom erosion control flaps, such as front bottom flap (80) shown in the FIG. 11 front view, engage stakes (e.g. 12" steel for example) via grommets to stake the flaps to native soil or other fill material to provide securement in place. The front bottom erosion control flap (80) (and similar back bottom erosion panel, if desired) prevents the modules from being undermined by water, and funnel the water flow into the inlets of the filtration modules.

Securements, e.g. stakes, are also shown and secure the modules in place on the ground via the front ground erosion control flap (80) shown. In the embodiment shown, this includes one or more each of front and back stakes (103,105) driven into the ground through front and back grommets in the flap (80), respectively. In other embodiments, this may involve other lumens or couplers which may be provided via the modules for stake engagement, or the stakes may simply abut the modules to hold them in place. As with other features herein shown and described, while this exemplary arrangement of securements may be particularly beneficial, they are also optional under the broad aspects of this disclosure, and are not necessarily to be included in all physical embodiments constructed to meet a particular need or environment of use.

It is also to be appreciated that an altered swale bottom with sand or other form of "backfill" material (107) is also provided below the assembly (200), as shown in FIG. 11.

Figure 12:
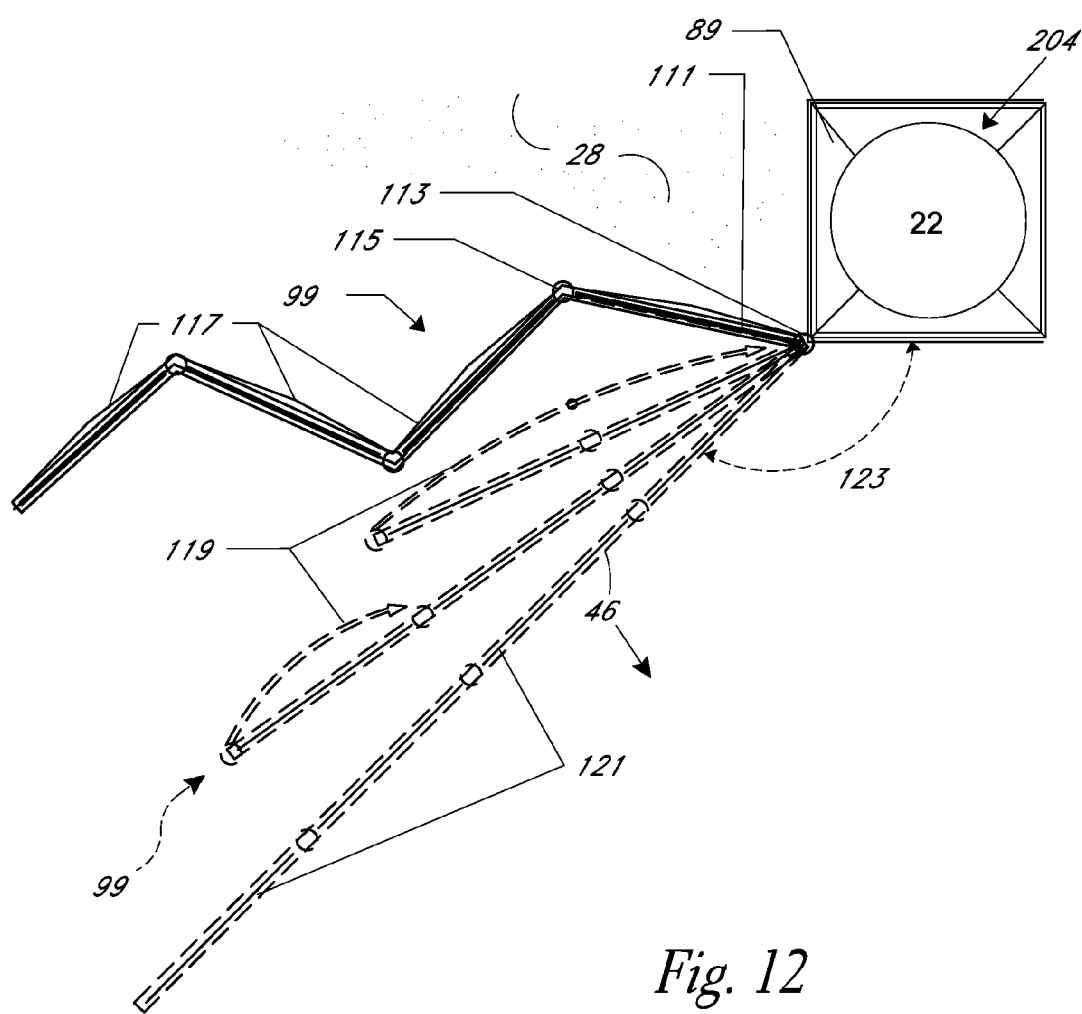
FIG. 12 shows a schematic plan view of an adjustable erosion control panel assembly embodiment that is considered suitable, for example, for use as a component part in combination with other embodiments elsewhere herein shown and/or described.

FIG. 12 shows a schematic plan view of an adjustable erosion control panel assembly, such as considered suitable for use as a component part among the prior embodiments described by reference to the prior FIGS. above, according to another aspect of the disclosure. In this exemplary case, the adjustable panel (99) is foldable into a collapsed configuration for transportation and/or initial insertion into a bioswale ditch or gulley, and adjustable by being extendable to an extended configuration that is deployed to provide the desired erosion control at the filter assembly corners. Further to this exemplary embodiment shown, this is provided via an articulating construction of panel wall segments that are hinged or bendable at locations to allow the adjustability between the folded and extended configurations. This is shown for example in shadowed line details, revealing different articulating conditions between the configurations, via adjustable angle (123). Additional more detailed modes of this aspect are also described for example as follows. On the side of panels (99) is a sand backfill material (28). Panel (99) has a down slope side (46). Filter module (204) comprises a structural container (89) as previously described above, with an open top (22) to accommodate the insertion, removal, and/or growth of planted media from within the container. The adjustable panel (99) extends from a corner of the module container, which for example would typically be a front or back corner module in a module array assembly as herein described (e.g. to manage water flow into and out from the assembly)

Further details of the side erosion panels are described as follows. One or a plurality of linked envelopes (117) extend from the container (89). The envelope (117) may comprise a variety of specific constructions as suitable design choices to meet various specific needs. However, to provide examples for illustration it may have one or more of the characteristics of non-permeable, semi-permeable, permeable, high tensile strength, weave, plastic (e.g. may be non-permeable high tensile strength weave plastic). Boards (111) are inserted into the envelopes (117) when deployed, and are of sufficient rigidity and strength to provide the barrier functionality desired. They may have varied constructions, but may be for purpose of providing one illustrated example about 22 inch×22 inch×1 inch dimensions of high compression plastic construction (though may be other suitable materials, e.g. metal, of appropriate structural integrity), and according to yet a further example may have radiused corners (e.g. 0.5 inch, for example) to help ensure they don't cut into the envelope material and help ensure smooth insertion/removal. One more specific example of suitable board material for this purpose may be, for example, similar to typical kitchen cutting board materials.

FIG. 12 also shows a suitably high strength hinge (113) coupled to one end of the panel envelope (117) provided at the panel (99) section located adjacent the container (89). This may be also attached to bag straps previously described. Additional hinges (115) are also provided, in spaced series along the length of the series of adjacent envelopes (117) providing the articulating panel (99). Boards (111) are inserted into the envelopes (117) between the spaced hinges (115). This allows angular articulation of the formed sections of articulating panel (99) for deployment. Without insertion of the boards (111), this spaced hinged configuration for the envelope (117) of the articulating panel assembly (99) allows for folded articulation for ease of transportation, and initial insertion to a desired site before completed deployment.

For further illustration, as shown in shadow in FIG. 12, unused pockets (119) fold back onto the erosion control panels and for placing in the trench. The articulating series of hinged, adjacent envelopes (117) may be placed on the backfill side of the panel structures, for example, and in yet a further example may have a cover (e.g. VELCRO™ (a hook and loop fastener)), though other relative locations and configurations may be suitable so long as consistent with the functional intended roles as broadly described herein. When completed in an overall assembly, with fully assembled and extended panels (121), they are buried into ground material in a trench, such as for one specific in situ example of one illustrative intended use (among many potential intended uses) may be in a trench that is about 8 foot long by about 6 inch wide by up to about 24 inches deep. This configuration and approach for installment aids in their securement in place in the extended, angled (123) configuration relative to the filter module (204) from which it is extended.

It is to be appreciated that the specific configuration shown, and materials and dimensions described, are highly beneficial but the broad aspects of the current disclosure are not necessarily required to be so limited by these exemplary embodiments. Panel locations, sizes, angles, depths and other dimensions, and material construction, may be customized as per engineering plans to meet specific needs for particular intended environments of use.

FIG. 13 shows an elevation view of finer details of an articulated erosion control panel such as described above by reference to FIG. 12, according to a further aspect of this disclosure. More specifically, boards (111) are shown, and may be constructed as described above for FIG. 12, in addition to additional features shown here (e.g. by reference to exemplary dimensions and shapes of boards (Ill, 133, and 131). A side view of stakes (123) is also shown separately in the figure in cut out and in an exemplary embodiment relative to boarded envelopes (125) when assembled in situ in the ground. Further to this exemplary embodiment, such stakes (123) may be for example between about 24 inches and about 36 inches long, #4 Rebar material, with about a 3 inch "J" hook at top which allows the stake to be hammered into place as centered onto the pocketed boards to secure them into place. The envelope pockets (99) may be of similar construction as described above, and according to further details shown in FIG. 13. In the particular illustrative embodiment shown in FIG. 13, a top fold (127) of the envelope pocket (117)(FIG. 12) may be opened to accommodate insertion of the boards (111) into the exposed open pockets, and fold down to close the top of the pockets. In another further example, this may include a securement or attachment mechanism, such as for example VELCRO™ (e.g. two sided, one on the envelope folded top, and the other interfacing VELCRO™ surface on the pocket body where contacted upon closing). This may be on the side opposite the sand backfill, for example, to enable closing after filling with back fill—or may be on the backfill side and folded down and closed prior to filling with backfill material up to the folded level.

The system shown in FIG. 13 is installed as follows. The stakes (123) are inserted to secure the panel down as secured stakes (101). While various locations for this along the panels may be suitable, this is shown in the illustrative embodiment of FIG. 13 to be located between the hinges (115) along the panel assembly (99)—which hinges may be as described above for FIG. 12. This is installed within an existing swale slope (129) of finish grade (44) as shown in dashed line shadow in FIG. 13, and an altered swale bottom (107) of finished grade.

FIG. 13 also shows how the articulated panels (99) are installed relative to filter media containers (89) of filter modules (204) in a modular filtration assembly (200), such as according to the previous embodiments described above. A set (109) of multiple stakes (101,123), which set in the example shown is 3 stakes, are inserted to secure the first panel extending from and immediately adjacent to the filter media container (89) and provide additionally robust strength to the panel's securement at this interface. It is noted that the trench bottom and slope grade (44) vary, and robust securement is highly desired though may be challenging. The boards (111,131,133) may be inserted into place within the envelopes once the rest of the system is installed.

Figure 14:
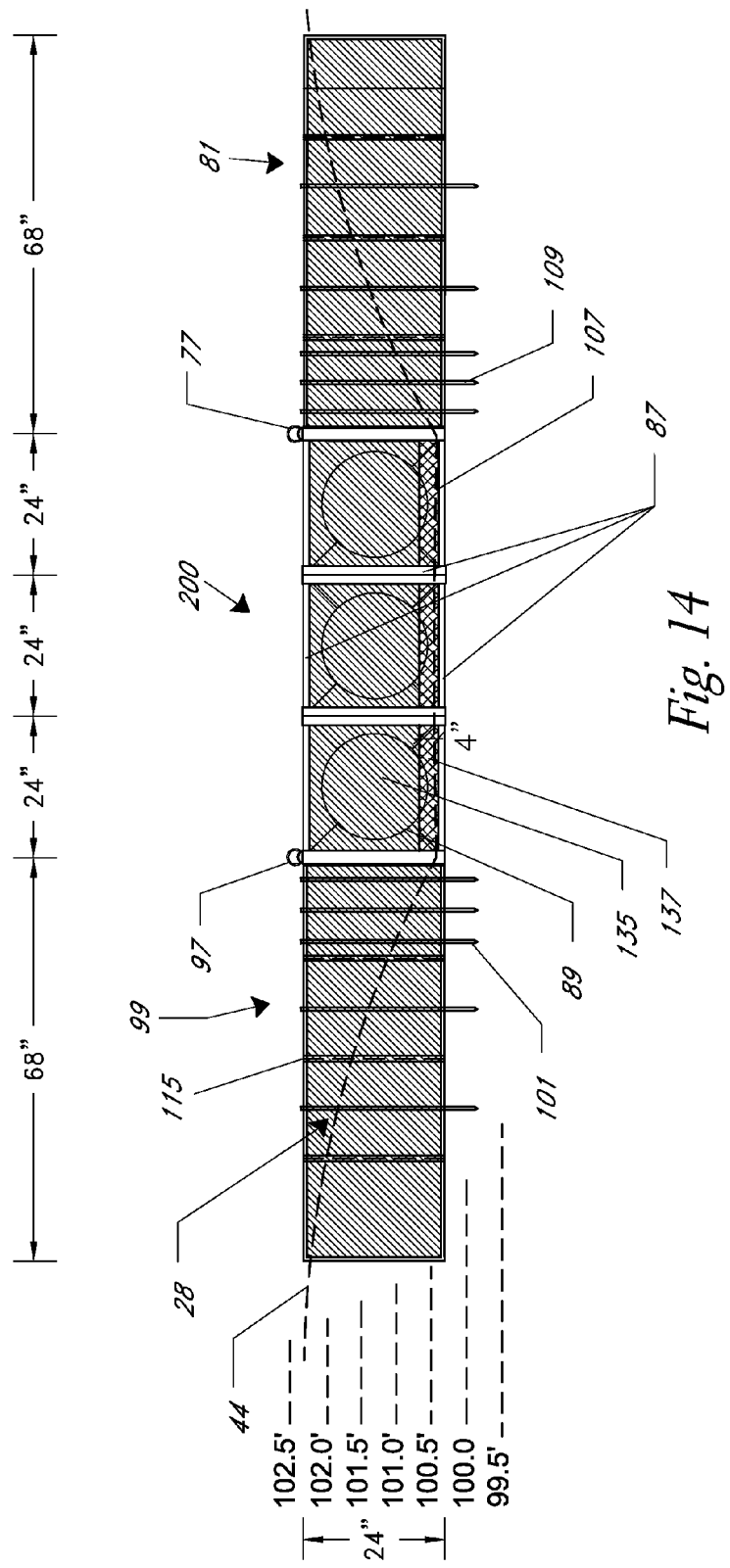
FIG. 14 shows a filtration assembly embodiment, similar to that shown and described by reference to FIG. 13, in elevation right side view and as installed relative to a backfill, sloped grade, and swale bottom.

FIG. 14 shows the filtration assembly (200) just described above by reference to FIG. 13 in elevation right side view. The system is shown installed relative to sand backfill (28) and varied slope grade (44) and altered swale bottom (107) of finish grade. The location of lifting rings (77,97) are also shown in the installed configuration, as also for erosion control panels (81,99), lift straps (87), containers (89), and stakes (101) including the set of three (109) stakes at the first panels from the filter assembly (200). A first jacket is placed over a second liner, which according to one example may be as follows. A first removable, non-permeable, high tensile strength weave plastic membrane (135) is placed over a permeable, high tensile strength, weave plastic membrane (137) that is draped around the filter containers (89). It is appreciated that the bottom portion of the assembly's sides, e.g. about six inches high, may be made permeable (e.g. as shown) to allow drainage from the sand backfill into the module (such as similarly noted above).

According to one further embodiment, the bag around the container tanks, and the container tanks, are black or another dark color (though not a strict requirement). While such coloration is certainly not necessary to achieve many of the objectives of the embodiments, it does provide some additional benefits if desired. Generally, black (or again, other relatively dark colors) will be characterized as absorbing and retaining more winter light and related heat than relatively lighter colors. This allows for maximum biological activity, plant root growth from the HPB media of the modules, and storm water mitigation as a result.

Membranes contemplated, both permeable and semi-permeable, will generally be engineered to suit a particular purpose and intended use consistent with the present embodiments. However, certain more specific examples are provided for further illustration of various implementations that may be achieved consistent with this disclosure. According to some examples, such membranes may be for example UV treated, and/or weaved integral to lifting straps described. Such membranes described, according to certain further examples, will generally be characterized in their design and material construction as providing one or a combination (and ideally, though not necessarily, all) of the following advantages: allow the HPB to "breath," providing gas exchange, water infiltration, heat transfer, maximize biological activity, provide structural integrity, flexibility, and resiliency.

Removable non-permeable membranes described are generally intended to be used to direct storm water flows through the HPB, protect against other contamination or communication between sides of the membrane, etc.. In certain examples and implementations, they will generally be attached to lifting straps, such as for example using VELCRO™ (though other attachment means may be suitable). Sand backfill described in the in situ installed configurations and embodiments will assist to ensure membranes are secured in place during use. By providing these membranes to be removable according to still further embodiments, numerous HPB layouts can be achieved with maximum effect, using a limited number of structural models. While this flexibility for customization is highly beneficial, it is also appreciated that such "removability" is not a strict requirement, and such components may be affixed or secured in a more permanent manner for a given HPB implementation.

Figure 15A:
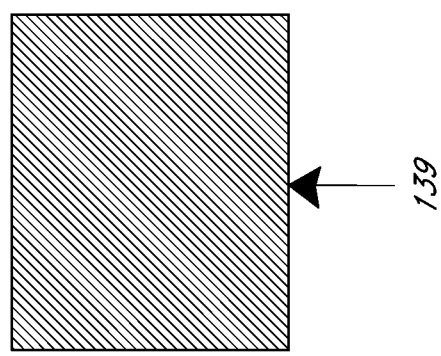
FIGS. 15A-C schematically show a series legend of varied membrane permeabilities as examples, respectively, for use with the HPB examples and embodiments elsewhere herein shown and/or described.
Figure 15B:
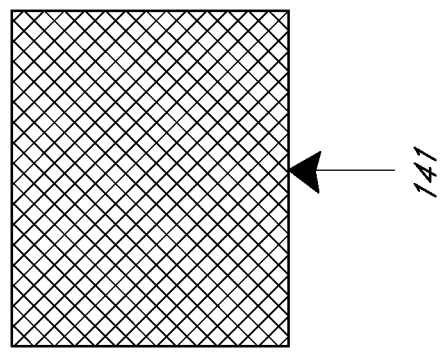
Figure 15C:
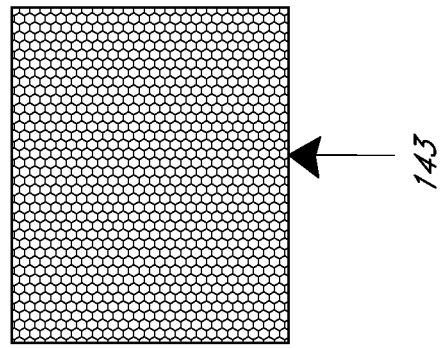

FIGS. 15A-C schematically show a series legend of varied membrane permeabilities and described below as intended for use with the exemplary HPB embodiments described hereunder. For example, membrane (139) shown schematically in FIG. 15A represents a relatively non-permeable membrane. Erosion control panels will typically be generally non-permeable membranes, per their principal function to block and direct water flow. According to another example, membrane (141) shown in FIG. 15B represents a relatively permeable membrane, whereas membrane (143) shown in FIG. 15C represents a relatively semi-permeable membrane. Each permeable and non-permeable membrane provided for use according to various aspects of the current embodiments will be provided with permeability rates that will be established per engineering needs to meet a particular intended application for use.

FIGS. 16A-B show schematic view of another water filtration system (144) according to another aspect of the present disclosure, and includes a pre-treatment system (146) and primary treatment system (158) as described in further detail immediately below.

More specifically, FIG. 16A shows a water pre-treatment system (146) as follows. A top hat (145), which generally comprises a box (which may for example be made of steel, or other suitable material) sits around an inlet and helps meter and filter the water into the inlet, e.g. as shown with a modified intake (147) to meter water. A sand bag and pipe (149) is also provided to meter water. Pre-treated effluent in an inner ponding area (151), a pre-treatment bag (153) (which may be, for example, about 12 square inches in volume), and raw effluent (155) (e.g. pumped to the location) are shown. The pre-treatment bag (153) sits between the raw effluent (155) and the ponding area (151), which may be custom configured depending upon how the raw effluent (155) is directed to the area but may be for example a circular bag or sock, e.g. in the form of a "donut." A pipe outfall (157) (which may be for example about 10 inches in diameter) is also shown, and conveys the pre-treated water from the pre-treatment system (146) to the primary treatment system (158). This assembly may be configured and operated to function for example as follows. Raw effluent is pumped to a sunken area around the inlet. The effluent flows through pre-treatment bag (153) into the inner ponding area (151) around the inlet. From inner ponding area (151), the water then flows through a system of sand bags and pipes (149) that has the effect to meter the water into the inlet.

FIG. 16B shows a primary treatment system (158) as follows. A "living bag" (e.g. container or bag of biologically enriched and/or organic filter media) or other suitable form of retaining wall (93) is shown, and while beneficial is not strictly required or intended to be limiting to other aspects of the assembly. A pipe end (159) discharges the pre-treated water from pipe outfall (157) into the primary treatment assembly (158). While various specific configurations for this may be suitable, in the particular illustrated example shown (and in many typical examples) this comprises what will typically be a bent elbow, which may be removable, movable, and/or fixed, and may be bent for example at about 90 degrees to ensure efficient gravity discharge of all water from the pipe (157). This is coupled to a top of a water disposal receptacle (161), such that effluent flows along through the pipe (157), out through the elbow end (159), and into the receptacle (161). A connection pipe (163) connects multiple adjacent receptacles to provide water flow therebetween. Water disposal receptacle (161) may be constructed of various specific designs and materials to suit a particular intended use. According to one example for illustration, however, this may be similar to a modified industrial steel (or other material) trash receptacle, such as for example that is configured to process about 800 gallons per hour ("GPH") of effluent each receptacle, for about 2,400 GPH capacity when three are provided for example in a multi-receptacle system (as shown in the specific example of the FIG. 16B illustrative embodiment, which "daisy chains" three such receptacles together). These receptacles (161) may also be provided with a cover, which may be plastic or other material for example, and which may also be locked for security and safety if that is a concern. They will generally have waterproof (impermeable) sides according to the example shown, and according to further examples may generally also be provided with wheels for movement and transportation if desired.

Effluent (165) percolates through filtration media contained within the receptacles (161) for primary treatment. This filtration media may be provided in a number of ways, such as for example via media bags (167), which may be for example about 1 cubic yard in a receptacle such as according to the examples described above, and (depending upon the particular media, percolation rate, and in-flow/out-flow rates desired to be processed) may for example be configured to provide for about thirty minutes of residence time, and may be replaced as needed.

It is to be appreciated however—in relation to both the present embodiment and other embodiments and aspects described herein—that the particular media chosen, amount used, and engineered configuration in the overall system (including flow resistances and pressure drops across the media), will impact residence dwell time of the water in the media, and combinations of factors in the effluent water itself, related filtration desired, and chosen media, will impact the engineered design choices and related dwell time—all as would be readily apparent to one of ordinary skill based upon a review of the entirety of this disclosure.

A gated security fence (169) is also shown in the illustrated example of FIG. 16B, and may also be provided for security and safety. A drain channel base (171), which may be for example a concrete pad with a drain, is located under the receptacles (161) and provide a channel for effluent draining downward through the media in and from the receptacles. This may include additional filtration media (167), which may be for example bagged loose filtration media, as additional redundancy or may be "polishing" operation of the primary filtration system (158)—and which may be replaced as needed. A pipe fitting (173) is coupled to the media-laden drain channel base (171). This is coupled to pipe (177), which may be a "daylight" pipe for example, which pipes effluent from the primary filtration system (158) to another location, which may be for example another bioswale (175) that may comprise further infiltration as a redundant system, and which may be replaced as needed.

Figure 17A:
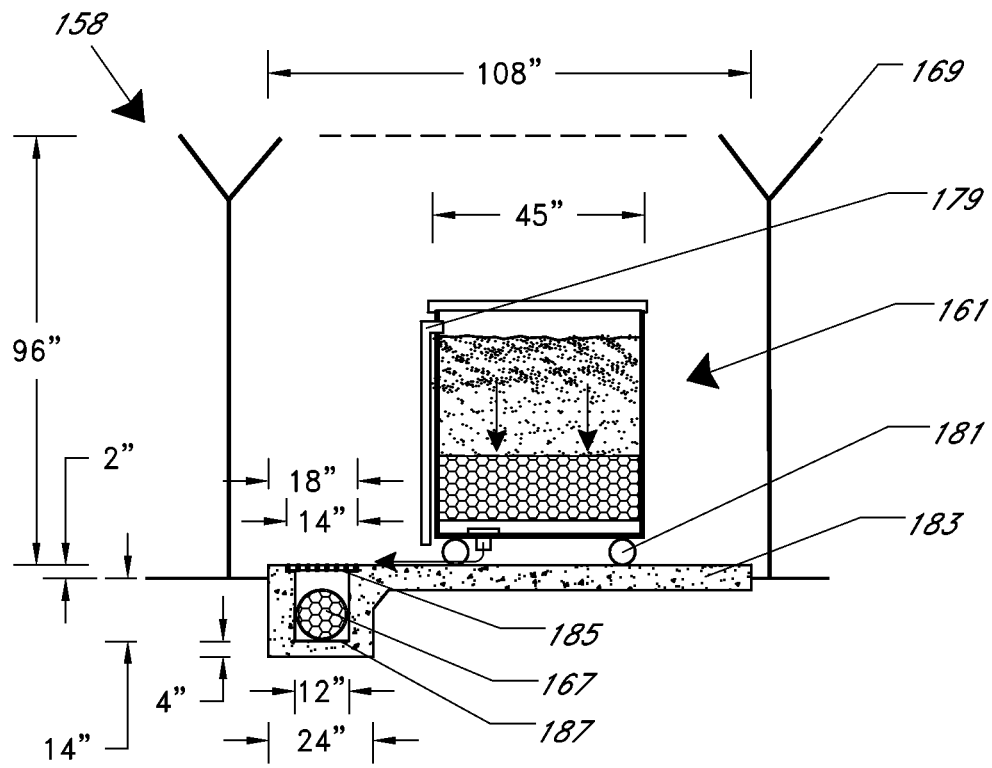
FIG. 17A shows a cross sectioned view through a receptacle embodiment that is considered suitable for use, for example, according to the primary filtration system aspect of the system embodiment shown and described by reference to FIG. 16 embodiment.

FIG. 17A shows one cross sectioned view through a receptacle (161) of the primary filtration system (158) of the FIG. 16 embodiment. More specifically, this shows the gated security fence (169), an overflow pipe (179) to convey overflow water from the receptacle (163) to the drain channel base (171) (and which may be for example about 1.5 inches in diameter), receptacle (161) as described in FIG. 16 and further shown in more detail here, wheels (181) which may be for example heavy duty steel sweevel or swivel wheels, base pad (183) which may be for example about 4 inches or more in thickness, may be for example made of concrete or other robust supportive base material, and for example accommodate a 2% drainage (e.g. about 1 inch in about 4 feet) to the channel drain. Grate (185), which may be for example steel or other suitable material, is shown covering the channel drain. A filter (167), which may be for example a bag of loose, packed, or other form of filter media, which may be for example about 12 inches in diameter (or may be another suitable filter), is provided in the drain channel and as noted above may add to primary filtration treatment downstream from the filtration media in the receptacles (161). The bottom (187) of the drain channel drains toward the drain pipe, such as for example at about 2% drainage (such as noted above). It is to be appreciated that such specified parameters, e.g. rates, dimensions, materials, etc. are shown and/or described as examples and not intended to be limiting to the broad aspects of the embodiments described, and variations from those specified parameters are contemplated within the scope of this disclosure as apparent to one of ordinary skill.

Figure 17B:
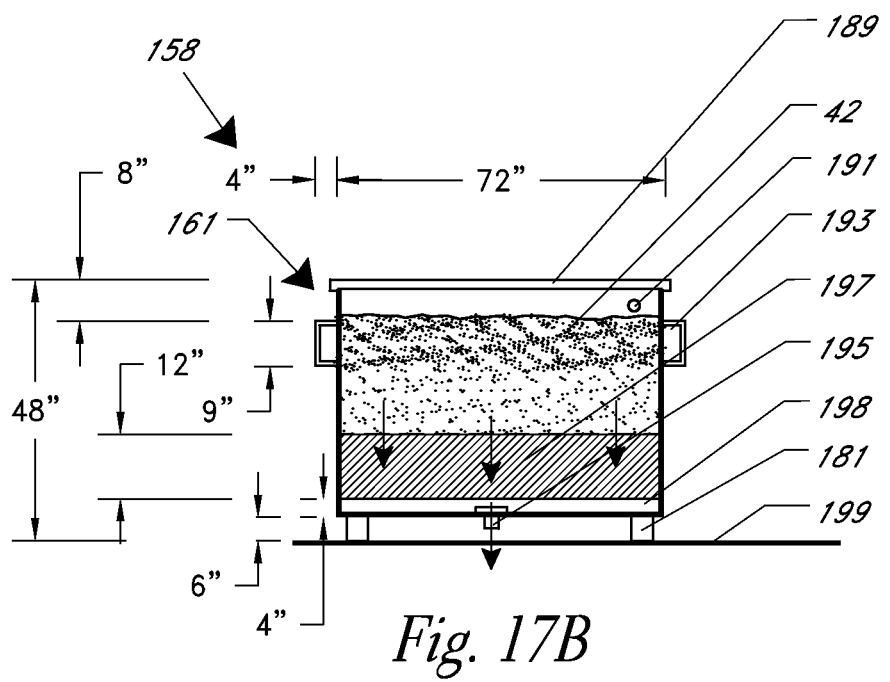
FIG. 17B shows another cross-sectional view of a similar water receptacle similar for example to that shown in FIG. 17A, but in front view.

FIG. 17B shows another cross-sectional front view of the water receptacle (161) which may be as described above, and as further shown in additional detail in this figure. This may also have for example a waterproof seal inside the container, and about 800 gallon per hour capacity, for example as constructed in the assembly with the filtration media, drain below, etc. A cover (189) is shown, and may be for example plastic, and may for example be lockable. Effluent (42) received from the pre-treatment system (146) (FIG. 16A) is shown in the receptacle (161) above a filter or filtration media (197) located on the bottom aspect inside of the receptacle (161). Overflow pipe (191) is shown to provide an outlet to the effluent if rises too high within the receptacle (161), as also described above, and may convey the overflow to another receptacle, toward the bottom drain, or another desired overflow destination as desired. Sleeves (193) are also shown as a further example, and while certainly not required for purpose of providing the water treatment intended by this assembly, allow for enhanced engagement and lifting of the receptacle (161), and may be constructed of high strength material such as for example steel (or other suitable material). Filter (197) provides the primary water filtration treatment at the bottom of receptacle (161), and may be for example of permeable or semi-permeable bag of filtration media (or other suitable filter). A outlet valve (195) is provided, and may for example be metered and may for example accommodate about 800 gallon per hour flow (e.g. according to the particular implementation example referenced previously above). An air gap (198) is also shown, and may be for example about 4 inches. This enhances percolation through the filter (197) above into a receptacle area of reduced or relatively low resistance and above the valve (195), and may also provide some air which may assist in the performance and/or sustainability of certain filtration media (e.g. biological and/or organic materials which may require some oxygen to "live" and remain functional as intended). Wheels (181) are also shown, and as described also above, as is a base (199) shown to support the receptacle (161), and which may be for example a concrete finish or other suitable support base for the intended particular system and use.

Various aspects described above provide, among other things, engineered modular HPB solutions designed for the storm water quality runoff retrofit market. The systems are scalable and modular in nature, and designed and built to be highly flexible for customized implementations to suit the needs of the client.

One objective of these aspects is to provide a high performance bioswale that can be readily and efficiently maintained when needed. The bioswale is the number one device prescribed and installed by professionals trying to remediate polluted runoff from point source locations. The scalable HPBs according to certain aspects of the present disclosure uniquely provide one or a combination of up to all of the following benefits:

1. can be above ground bioswale as well as in ground or integrated into the current landscape
2. when the bioswale needs to be changed because it is either full of pollutants or silt, the traditional bioswale requires a crew of maintenance workers to dig out the saturated bioswale and replant the vegetation that is dying in new soil. These preceding approaches need to put the entire used product into landfill. The current invention uses a cartridge system that allows the bioswale owner to simply replace a "spent" cartridge with a ready to use new cartridge.
3. Typical bioswales require desiltation every 3-5 years. But this often does not occur. The vast majority of bioswales go unmaintained and are rendered useless. The efficient serviceability of the modular cartridge system of the present disclosure overcomes these obstacles and issues, by allowing replacement of biomedia and vegetation in simple cartridges easy to replace.
4. The modular cartridges capture nutrients in storm water and filter it out.
5. What comes out of the present filtration system embodiments is cleaner storm water suitable for depositing in the cities storm drain systems or re-use for irrigation.
6. The embodiments are scalable and readily customizable to various configurations, sizes, and capacities, and may be used on private and public property as a retrofit to enhance existing drainage systems.
7. The present embodiments can also be readily implemented and used in new development and can be used in "MS4" permits ("Municipal Separate Storm Sewer System," a national storm water requirement).
8. All or most of the components of certain of the embodiments may be off-the-shelf products, and so readily and efficiently deployable for widespread use.

9. Custom blends of targeted pollutant removal filter media may be provided in the specialized delivery systems of the present embodiments, and may be customized for particular sites and environments of us, and in fact may be readily modified at installed sites to accommodate changing needs relative to the water influent or effluent or to implement new advances in filtration media into installed replacement cartridge-based delivery systems.

10. The embodiments provide a primary solution for the landscape industry and may be readily and efficiently maintained by the landscape industry 11. Many of the parts employed within the embodiments may be chosen as recyclable materials, including in particular the filter media and vegetation 12. The embodiments may be built to "cradle to cradle" standards, such that all the parts can be reused or re-purposed to meet zero waste requirements. The filter media in particular can be chosen to be processed and the vegetation can be composted for reuse in the landscape.

13. The "above ground" HPB typically involves a "cradle," which may often be chosen to be a fixed device in the landscape that holds the HPB. However, the HPB itself is portable or moveable, and modular. The cradle is also not limited to be fixed, and may also be modular.

14. The cradle of the above ground HPB embodiments may also be provided with redundant water quality components to enhance the overall HPB performance in water filtration and treatment, such as for example a media bag fail safe that the water effluent from the primary treatment filtration assembly needs to be pass through to get to the storm drain.

15. The cradle of the above ground HPB can also be integrated into the landscape using fine sand, sandy loam or a custom engineered filtration media for addition pollutant reduction.

16. The cradle that holds the HPB unit can also be configured in any shape or size to fit the application of the site, and can be further customized such as for example a hole lined with geotextile or a fabricated "box" to fit the customer's needs.

17. Water can also be added to the filtration systems of certain present embodiments from below the HPB apparatus as well as from the top or side of the device. This provides a 360 degree application of storm water treatment, utilizing gravity flow and/or pumps when appropriate to suit a particular need and/or desire.

18. No mechanical devices, e.g. pumps, are required according to many of the aspects and related modes and embodiments herein described and shown—in particular which rely on gravity flow, resident time within filtration media, and water pressure to move water through the media. However, it is also appreciated that a hydraulic component may be incorporated in additional embodiments, such as for example for the cleaning of the storm water, or moving water through filtration assemblies oriented differently than strictly for gravity filtration (e.g. other than vertically oriented with top and bottom cisterns).

19. The present embodiments provide for custom engineered solutions to provide specific residence time for storm water within the filtration components to achieve adequate, reliable filtration results sufficient to meet water quality standards applicable to targeted use applications for the water effluent 20. Various of the present embodiments are configured to incorporate vegetation in combination with the man-made constructed device structures. This vegetation will sequester heavy metals and enhance water quality, and including hyperaccumulators in certain embodiments which will sequester heavy metals, extract it from the storm water in the root system and translocate it to the shoots where it can be harvested and recycled/composted as a nutrient.

21. The chosen vegetation may be draught tolerant and/or hyperaccumulators, and friendly for flourishing in various climates, including for example California.

22. Filtration cartridges, according to certain highly beneficial aspects of this disclosure, comprise permeable bags which hold loose filter media, and can be used separately when needed and can be customized to fit any site requirements. Further beneficial embodiments of this aspect include, without limitation, the filter bags, and/or mega socks around the module array of the overall filtration assemblies, may be constructed of recyclable material It is to be appreciated by one of ordinary skill that multiple types of HPBs are disclosed herein, including without limitation two general categories of HPB: above ground, and below ground or "integrated."

The "Above Ground" embodiments may take various forms. One particular "above ground" aspect contemplated herein comprises a "swill recycler" as follows. One particular swill recycler embodiment is used to recycle the swill from the bottom of cans and bottles and turn it into water suitable for irrigation, and may be used for example in high volume retail or commercial enterprises such as for example a stadium. This can also take swill from other sources, such as for example a mop buckets, for example from a stadium or parking lot, and clean it to EPA benchmarks. An example of an above ground system is provided for example according to the aspects, modes, and embodiments herein described by reference to FIGS. 16A-17B.

Another particular "above ground" aspect contemplated herein comprises a "bioswale retrofit HPB" as follows. This is modular, and can be custom designed into a bioswale system, such as for example comprising multiple (e.g. 4, for example) bays for water collection. Pre-treatment and post-treatment filtration assemblies may be deployed to enhance water quality for standards compliance. This may also fit into a cradle, which may be sized and located in the existing landscape drainage system to enhance water quality. Examples of this may be provided, for example, according to the various aspects, modes, and embodiments herein described by reference to FIGS. 4A-14.

The "below ground integrated" embodiments may also take various forms, with a few exemplary embodiments described as follows. The present embodiments may be deployed to retrofit existing bioswales, or new development bioswales. These present embodiments may also be easily adapted to accommodate many different types of environments of use, including for example but without limitation: green streets, parking lots, Low Impact Development (LID), roads, bridges, dams, industrial sites, residential sites, commercial sites, multi-family, wherever there are cars and vehicles and infrastructure projects. Certain further specific examples also include, without limitation the following. A water reuse bioswale is provided according to certain embodiments. This can be used for irrigation, landscape, or other water harvesting applications, such as for example: grey water reuse applications; roof top water reuse; storm water reuse; water retention system. A water detention bioswale is also provided according to still further embodiments. This is configured to capture, clean, and allow water to percolate or infiltrate into the ground or the storm water system. Examples of this may be found for example according to the various aspects, modes, and embodiments herein described by reference to FIGS. 1A-3.

Notwithstanding the above, it is also to be appreciated that each beneficial aspect, mode, and embodiment herein described may be implemented to suit a variety of particular needs and intended uses, including for example for either above ground or below ground applications, as would be apparent to one of ordinary skill.

Various different approaches may be taken to manufacture the HPBs according to the present embodiments of this disclosure. Certain particular beneficial examples however are provided as follows.

Various off-the-shelf components may be chosen and used to assemble the modular filtration delivery systems disclosed. According to one example, off-the-shelf "CUDO®" cubes may be used for the containers used in the modular filtration cartridges used in the filtration systems, such as modular arrays of such cartridges. One specific example of a specifically suitable CUDO® cube for many intended uses is available at 2 foot×2 foot×2 foot side dimensions. According to a further embodiment, filter media cartridges (e.g. permeable bags filled with loose filtration media) are constructed in a manner configured to slip in and out of the CUDO® cube, and thus readily replaceable in servicing and maintenance of an installed water treatment system. According to still a further embodiment, the inside of the cube is lined by a plastic coating or liner (e.g. tube) to make it easy for the maintenance worker can easily remove "spent" cartridges and replace with new ones.

Figure 18:
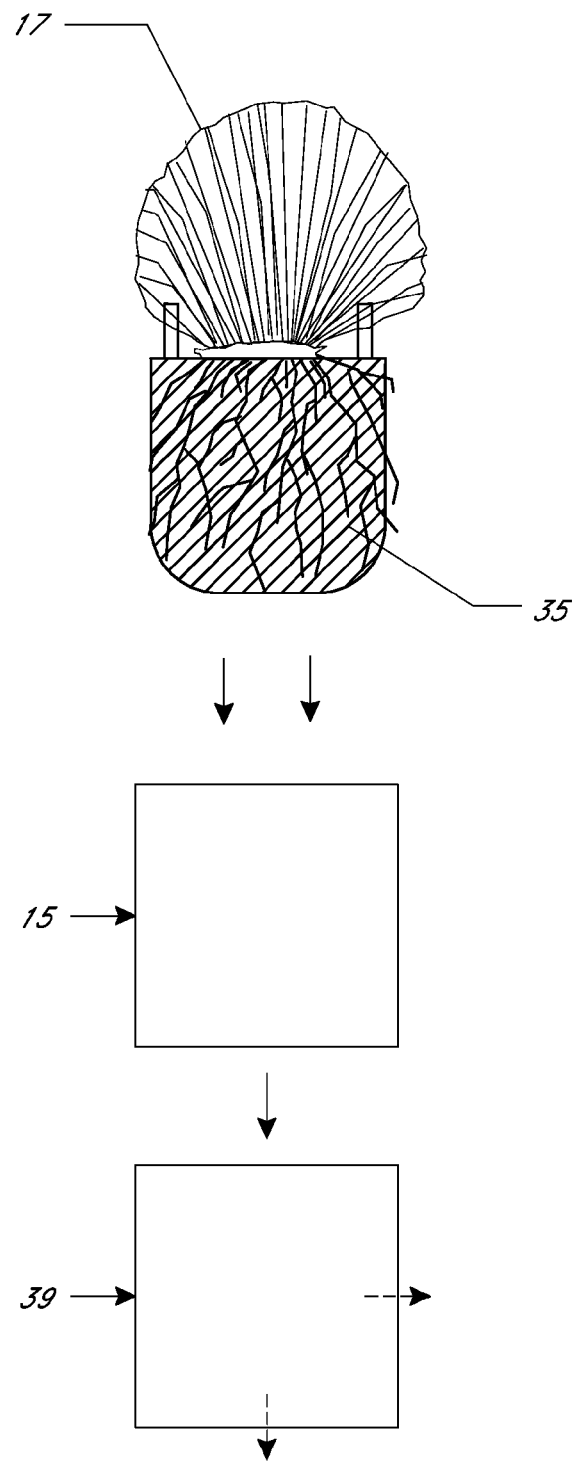
FIG. 18 shows a schematic view of certain intercooperating components of a cartridge assembly embodiment for use in a cartridge-based water filtration system such as for example according to various other embodiments herein disclosed.

For further illustration of one such broad aspect herein contemplated, a schematic representation of such a cartridge system suitable for use according to such modules is shown in FIG. 18. More specifically, a "wetland in a bag" or "WIB" assembly is provided which comprises a bag or other form of contained filter media (35) planted with plant/vegetation (17) (e.g. hyperaccumulators), which is removably insertable into mating container (15) through an open top thereof. Among other benefits of this highly "serviceable" configuration, it is well suitable for a scalable, modular filtration assembly comprising multiple such cartridge-based modules in an array (such as elsewhere shown and described hereunder). In addition, it allows for both standardized and custom WIBs to be designed to suit various types of implementations and various types of environments of use.

According to another embodiment, a permeable geotextile is provided around the modular filtration assembly when it is desired to infiltrate the treated water into the water table; whereas in another embodiment a non-permeable membrane is used when it is desired to reuse the water for irrigation or pump treated water into a storm drain or elsewhere. In another embodiment, a pump is provided which can operate effluent flow for various purposes, such as for example either a drip irrigation system or a pressure pump for spray irrigation, depending on requirements of the site. In further specific implementations among the embodiments, vegetation used may be carefully selected to remove pollutants in their growth process.

As also shown in FIG. 18, a second container (39) may be provided to interface with the cartridge-in-container assembly of planted media (35) and container (15) to receive as a receptacle water filtered through the first container (15), thus providing a paired water filtration and retention module of filter cartridge and cistern container. This can be adaptable for water flow from the second cistern container (39) through all or a specified aspect of its other walls that do not interface with the first filtering container (15), depending upon the desired purpose of the captured water and environment of use—as further described above. This modular approach is scalable to meet many different desires, needs, and environments of use, with virtually limitless combinations of multi-module configurations to fit varied available spaces and water flow/treatment environments.

According to one aspect exemplified by various of the illustrated embodiments of this disclosure, a water filtration system comprises a container which contains a filtration media. The container comprises at least two permeable walls configured to accept, and positioned to provide a path between, inflow of water influent into the container, and outflow of water effluent out from the container, respectively. According to one mode, the permeability is provided via an aperture through a container wall. According to another mode, the permeability is provided via a permeable or semi-permeable membrane. According to a further embodiment of this, side walls are relatively non-permeable. This contains the flow path within the container to remain translating through the contained filtration media, such as to fully treat the water as intended (e.g. via a desired volume of exposure and dwell time). In still a further embodiment, this is coupled with a catch basin or cistern container to receive the treated water effluent. This may be for example to reclaim the water, such as by transportation (via a pump or otherwise) to another site (e.g. irrigation, or simply disposal at another more desired location for water to enter the ground).

Figure 19:
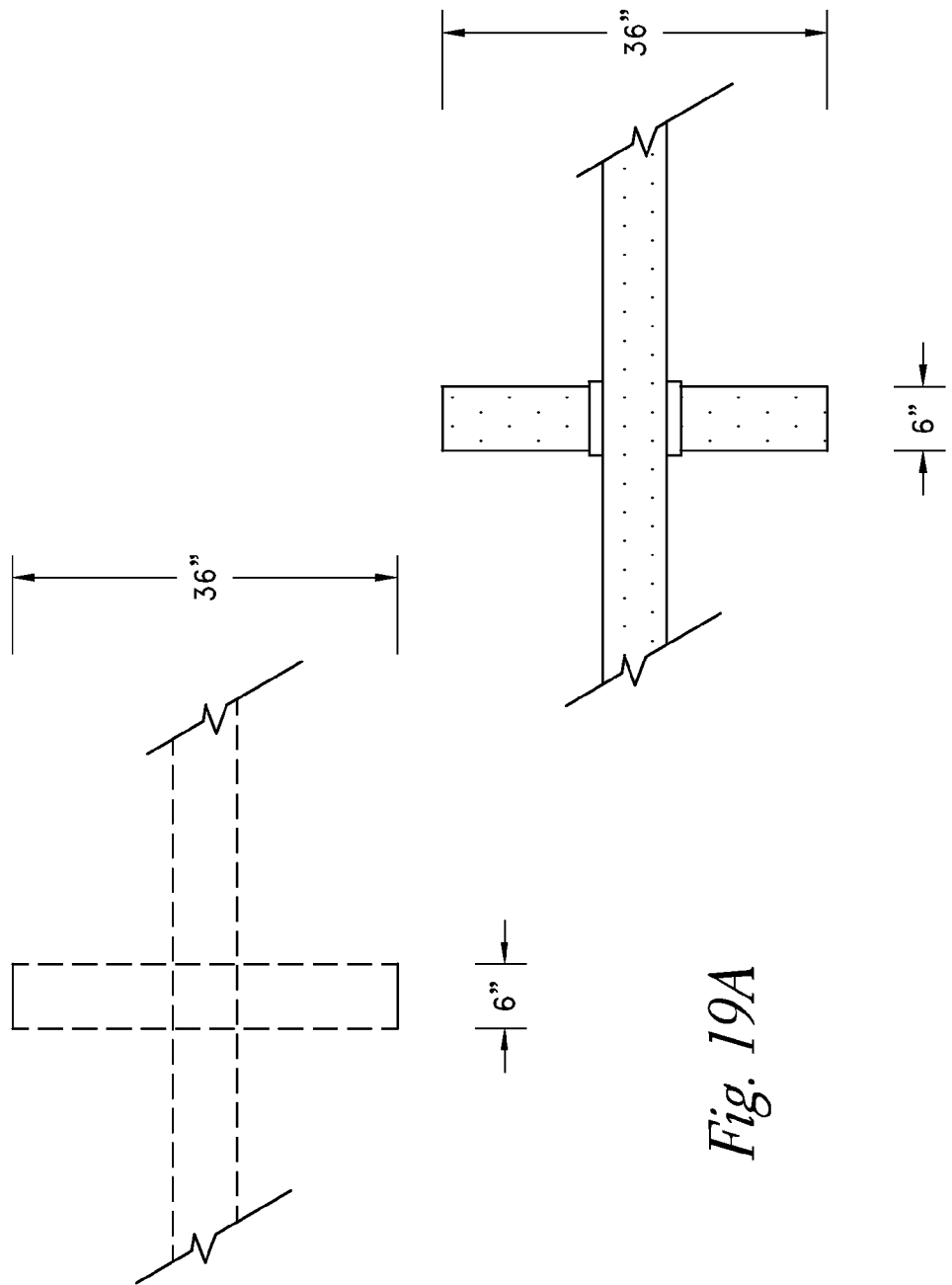
FIGS. 19A-B show schematic views of certain examples as mechanisms for conveying influent water across and into filtration modules, assemblies, and systems, including for example according to other embodiments herein shown and/or described.

Other aspects are also contemplated. FIGS. 19A-B show for example other mechanisms for conveying influent water across the tops of filtration modules (e.g. of the types described and shown in FIGS. 1A-3) depending on amount (e.g. flow rate) of water requiring treatment through the treatment system, e.g. for pollution remediation before entering the environment. The size of the manifolds can vary to accommodate such variable water quantity needs, from larger amounts of water (e.g. larger properties, agricultural or industrial needs) to small drip irrigation systems for smaller (e.g. smaller residential) applications. Also, despite the desired use of cistern containers below gravity filtration modules per "below ground" assemblies such as provided by the FIG. 1A-3 embodiments, it is also appreciated that certain aspects may be positioned "above ground" in other overall arrangements to suit a particular need.

Figure 20:
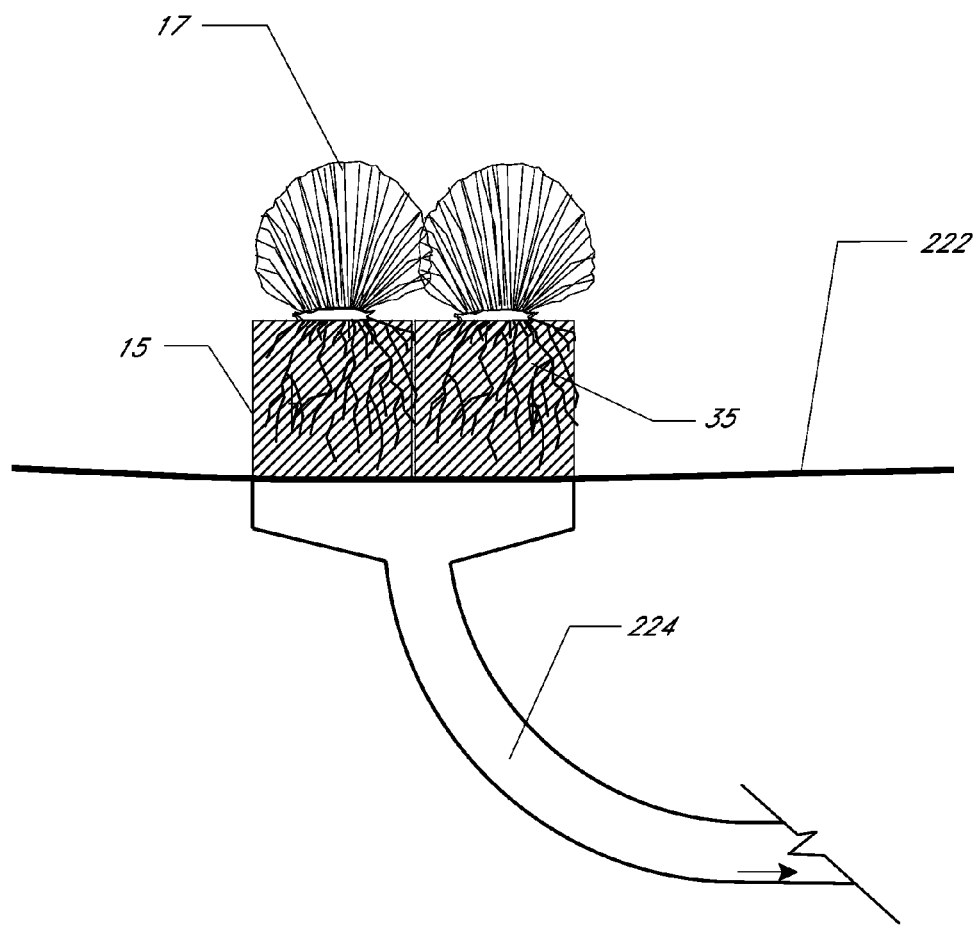
FIG. 20 shows an above ground water filtration system according to another present embodiment.

For example, FIG. 20 shows an above ground "WIB" approach, with 2 modules shown in the particular example illustrated (though other numbers may be employed, with virtually limitless configurations). This allows for influent to be pumped into a top of a filtration module having plant/vegetation (17) planted in a container (15) with contained filtration media (35), which contains gravity percolation via relatively non-permeable side walls through the contained media and into the ground below via permeable bottoms of the containers. This may be filtered directly into the ground, or into a container, well, or other conveyance system, as shown schematically at conveyance (224) for illustrative example in FIG. 20.

The above ground HPB, among other benefits, provides a beneficial flexibility to change the location of the HPB depending on site-specific water quality requirements. This portability makes it easy for transport from site to site depending on the city, municipalities, or large corporation needs. The HPB can simply be placed in or moved to the most strategic or acute need for remediation of the pollution within the localized watershed, and as such need and location may vary for a given property or HPB owner. This embodiment also facilitates the water quality treatment need of customers that cannot dig into the foundation or ground at their site but still want an HPB. The above ground HPB would typically utilize a pumped water conveyance to get the un-treated water into the HPB, and also may be implemented to convey the treated water out from the HPB for reuse or otherwise to a desired destination (although in certain implementations the treated water may simply be enabled to drain from the HPB into its surroundings or ground). In certain specific examples, an inlet valve may also be installed in order to regulate the contaminated water flow into the HPB, and/or an overflow conveyance may also be provided in order to manage water inflow that exceeds the capacity of the HPB. This also proposes a beneficial approach for treating rain water from a roof or other area, such as according to some examples with sufficient water or condensation that can be treated and reused for non-potable applications—and in any event to treat that water as may be desired (e.g. to meet BMP regulations for water run-off).

Various specific materials, designs, dimensions, etc. are provided and are considered highly beneficial embodiments of the present disclosure in one regard. However, in other regard, such specifics are also merely illustrative of broader aspects of the present disclosure and should not be considered to necessarily limit to such broader aspects unless expressly specified to be required. In particular, the various specific dimensions provided as such examples are intended to be "about" any particular values provided, with typical tolerances and ranges of suitable alternatives as would be apparent to one of ordinary skill. Where particular combinations of such dimensions are provided for exemplary illustration of certain embodiments, the relative relationships between them are also contemplated as having been herein disclosed as additional beneficial aspects (even if the specific values of the relative dimensions change). For example, certain lengths, widths, and/or depths of particular components shown and described for a particular assembly provide overall geometries which may be varied by changing certain sub-sets of such dimensions, but may also be fixed relative to the ratios of these values despite the valued changing (so long as their general relationship remains). Similarly, such dimensions of different component parts also have similar relative relationships which are similarly contemplated, also as apparent to one of ordinary skill.

It is therefore to be appreciated that, while certain dimensions may be provided in certain Figures or otherwise within this disclosure, these are provided only for the purpose of providing specific physical examples in order to illustrate a full understanding of how the broader aspects may be manifested in certain specific solutions for certain specific environments of use. Such particular dimensions are not intended to be limiting to the broader aspects, modes, embodiments, variations, or features, and may be varied according to one of ordinary skill for applying the present invention to a particular purpose or use. For example, the specific dimensions for various component parts or aspects of an assembly shown or described may be modified while still preserving their relative dimensional relationship with other components or parts involved in that assembly—e.g. the specific example shown or described could be "scaled" to larger or smaller, while preserving the dimensional relationships between parts. Or, these relative relationships may also be modified by one of ordinary skill, e.g. a certain component or feature may be made taller or shorter relative to its width or cross-sectional diameter, or visa versa, to fit a specific need or environment of use (e.g. available area to fit an assembly into or onto the ground etc.). Or, both actual dimensions of and relative dimensions between component parts or inter-cooperating assemblies may be modified. Similarly, certain embodiments are shown in the Figures to include a number of component parts, such as for example a number of filter cartridges in an overall water treatment system. Such numbers of components or parts are also provided for purpose of example to facilitate demonstrating examples of the present embodiments via the illustrative Figures only, and may be varied from what is shown or described by one of ordinary skill. In fact, various current embodiments uniquely provide the distinct benefit of scalability, both in terms of size and numbers of component parts (e.g. filter cartridge "modules"). These embodiments are specifically designed to enable the flexibility to be custom arranged, as would be done by one of ordinary skill, in virtually countless different specific numbers, relative positions, and configurations while still preserving and manifesting the broad inventive aspects of the disclosed invention.

For example, a geometric matrix of A (rows) by B (columns) of individual filter cartridge assemblies may be constructed in an overall water treatment system solutions according to various embodiments herein shown and/or described, wherein A and B may be whole numbers of any combination, e.g. they may be the same number, or may vary between them, without limit. The numbers chosen for each of these features, and specific geometric dimensions chosen for the individual filtering cartridge assemblies themselves, may be customized relatively between them by one of ordinary skill in order to fit a particular space available for the modular system, and/or water processing need, and/or to accommodate other considerations such as filtration characteristics and/or requirements of the media within the cartridges, vegetation involved in a bioswale embodiment implantation, etc.

Various combinations and sub-combinations, and modifications as may be made, of the presently disclosed components and embodiments and aspects are contemplated whether or not specifically disclosed hereunder, to the extent and as would be apparent to one of ordinary skill based upon review of this disclosure and in order to suit a particular intended purpose or application.

While certain embodiments of the disclosure have been described, these embodiments have been presented by way of example only, and are not intended to limit the scope of the disclosure. Indeed, the novel methods, systems, and devices described herein may be embodied in a variety of other forms. For example, embodiments of one illustrated or described HPB or water filtration assembly may be combined with embodiments of another illustrated or described HPBs or related assemblies, or similarly among or between other inter-cooperating assemblies in combination uses intended. Moreover, the embodiments shown and/or described may be utilized for other purposes than expressly described herein. For example, the disclosure contemplates other uses of the systems, devices, and methods described on various types of land, buildings, or other structures, or involving other types of water sources or intended uses of the filtered effluents. Furthermore, various omissions, substitutions and changes in the form of the methods, systems, and devices described herein may be made without departing from the spirit of the disclosure.

What is claimed is:

1. A modular water filtration system for treating a volume of water along a flow path, comprising:
   a portable, constructed filter container with a first constructed wall containing a first volume and with a first opening through which the first volume communicates externally of the first container and also with a first water permeable section;
   a portable, constructed cartridge comprising a second constructed wall containing a second volume and with a second opening and a second water permeable section;
   a filtration media soil housed within the second volume of the cartridge;
   a plant that is planted with roots in the filtration media soil and extending through the second opening from the cartridge;
   wherein the cartridge is contained at least in part within the first volume of the filter container in an orientation with the plant extending through the first and second openings, and with the first and second water permeable sections substantially aligned with fluid communication therebetween, and such that the cartridge and planted filtration media soil is removable from the filter container through the first opening;
   a cistern container with a third wall containing a third volume and with a third water permeable section;
   wherein the filter container and cartridge contained therein is secured in a stacked position adjacent to the cistern container in relative orientation together comprising a stacked container pair with the first, second, and third water permeable sections substantially aligned with fluid communication therebetween; and
   wherein the filter container is positioned relative to the flow path such that the volume of water flows into the first opening, through the rooted filtration media soil, across the interfacing first, second, and third permeable sections, respectively, and is captured within the third volume of the cistern container, such that the stacked filter and cistern container pair together comprise a water filtration and capture module.

2. The system of claim 1, further comprising a water inflow conveyance coupled to the first opening of the filter container and configured to direct the flow path of the volume of water into the module.

3. The system of claim 2, wherein the water inflow conveyance comprises a constructed pipe conduit providing the flow path from a first location of the volume of water into the filter container.

4. The system of claim 2, wherein the water inflow conveyance comprises a sloped grading of a region of adjacent ground adjacent to the module and configured to direct ground flow into the flow path into the module.

5. The system of claim 2, wherein the water inflow conveyance comprises at least one flow diverter wall positioned within a first flow path to divert the volume of water from the first flow path into the flow path into the module.

6. The system of claim 1, wherein:
   the filter container is positioned vertically above the cistern container resting upon a ground surface such that the stacked container pair comprises a vertically stacked container pair; and
   the flow path comprises a relatively vertical downward flow at least in part influenced by gravity and such that the module comprises at least in part a water gravity filtration and capture module.

7. The system of claim 6, wherein the ground surface comprises a subterranean ground surface within a recess formed below an adjacent ground surface adjacent to the module.

8. The system of claim 7, wherein the adjacent ground surface is graded in a manner to collect the volume of water toward and onto the module for gravity filtration flow through the module.

9. The system of claim 1, wherein the module is positioned with the filter container horizontally next to the cistern container, such that both the filter and cistern containers rest upon a ground surface such that the stacked container pair comprises a horizontally stacked container pair.

10. The system of claim 1, wherein further comprising a water outflow path by which the volume of filtered water captured by the cistern container flows out from the cistern container.

11. The system of claim 1, wherein the cistern container comprises a fourth water permeable section, and the water outflow path comprises a path through the fourth water permeable section.

12. The system of claim 11, wherein the fourth water permeable section comprises a side wall of the cistern container relative to a ground surface upon which the cistern container sits.

13. The system of claim 11, wherein the fourth water permeable section comprises a bottom of the cistern container relative to a ground surface upon which the cistern container sits.

14. The system of claim 1, wherein the plant comprises a hyperaccumulator.

15. The system of claim 1, wherein the filtration media soil comprises a living biological material.

16. The system of claim 1, further comprising:
   a plurality of said modules; and
   wherein each said module of the plurality is stacked adjacent to another said module to form a multi-modular assembly of stacked filtration and cistern container pairs.

17. The system of claim 16, wherein:
   each volume of water filtered and captured by each said module comprises a portion of a larger volume of water conveyed to the system.

18. The system of claim 17, wherein said cistern container pairs from each of said modules are in fluid communication such that water entering or contained within the cistern container pairs are distributed therebetween.

19. The system of claim 18, wherein the cistern container pairs together comprise an outer perimeter with perimeter sides and a perimeter bottom, within which the cistern container pairs are contained, and wherein a portion of the outer perimeter is impermeable to water flow into and out of the cistern container pairs.

20. The system of claim 19, wherein a portion of the outer perimeter is permeable to water flow into and from the cistern container pairs.

21. The system of claim 16, wherein the larger volume of water is apportioned into separate portions flowing along separate flow paths into each module by a water in-flow conveyance.

22. The system of claim 16, further comprising a securement assembly configured to secure the plurality of adjacent modules in relative position relative to each other.

23. The system of claim 1, wherein the cistern container comprises a portable, constructed container with a constructed wall.

24. The system of claim 1, further comprising:
a forebay coupled to the module and comprising a reservoir;
a first inflow conveyance coupled to the forebay and configured to direct a first volume of water from a first inlet flow into the reservoir of the forebay; and
a coupling conveyance coupling and directing the volume of water from the forebay and into the module through the first opening of the filter container.

25. The system of claim 24, wherein the coupling conveyance comprises a spill-over flow path from the forebay, when filled past a threshold volume, and into the filter container.

26. The system of claim 24, wherein the forebay further comprises a desiltation assembly configured to desilt the first volume of water prior to conveyance to the filter container of the stacked container module.

27. The system of claim 24, wherein the forebay comprises a wall with a permeable forebay section between the forebay and a second cistern container, and configured such that at least a portion of the first volume of water received within the reservoir passes through the permeable forebay section to the second cistern container.

28. The system of claim 27, wherein the forebay comprises a forebay filter between and fluidly coupled to the reservoir and the permeable forebay section so as to filter the water flowing from the forebay into the second cistern container.

29. The system of claim 28, further comprising an access conduit coupled between a location externally of the module and the third volume within the cistern container.

30. The system of claim 1, further comprising an outflow conveyance coupled to the third volume within the cistern container and configured to convey the filtered volume of water from the cistern container and to a remote location.

31. The system of claim 30, wherein the outflow conveyance comprises a pump coupled to the cistern container.

32. The system of claim 30, further comprising a remote storage reservoir coupled to the outflow conveyance and configured to receive and store the filtered volume of water received thereby from the cistern container.

33. The system of claim 30, further comprising an irrigation system coupled to the outflow conveyance or an intervening storage reservoir coupled to the outflow conveyance and configured to direct the conveyed outflow through the irrigation system.

34. The system of claim 30, further comprising a sensor coupled to the third volume of the cistern container.

35. The system of claim 1, wherein the cartridge further comprises at least one handle configured to lift the cartridge out from the filter container.

36. A modular water filtration system for treating a volume of water along a flow path, comprising:
a plurality of water treatment and collection modules, each comprising
a portable, constructed filter container with a first constructed wall containing a first volume and with a first opening through which the first volume communicates externally of the first container and also with a first water permeable section;
a portable, constructed cartridge comprising a second constructed wall containing a second volume housing a filtration media and also with second and third water permeable sections;
wherein the cartridge is contained at least in part within the first volume of the filter container in an orientation with the first and second water permeable sections substantially aligned with fluid communication therebetween, and such that the cartridge is removable from the filter container through the first opening;
a cistern container with a third wall containing a third volume and with a third water permeable section;
wherein the filter container and cartridge contained therein is securable in a stacked position adjacent to the cistern container in relative orientation together comprising a stacked filter and cistern container pair with the first, second, and third water permeable sections substantially aligned with fluid communication therebetween;
wherein each of the plurality of modules is positioned approximately adjacent to another of the modules, and with similar relative orientation between the filter and cistern containers of the respective stacked container pairs, so as to form a multi-modular filtration and capture assembly;
an inflow conveyance coupled to direct the volume of water into the multi-modular filtration and capture assembly in a manner to convey the volume of water across the respective individual modules and into the respective filter containers therein; and
an outflow conveyance coupled to the cistern containers of the multi-modular filtration and capture assembly in a manner configured to convey the filtered captured water therein out from the system.

37. A method for treating and capturing a volume of water along a flow path via a modular water filtration and capture system, comprising:
providing a portable, constructed filter container with a first constructed wall containing a first volume and with a first opening through which the first volume communicates externally of the first container and also with a first water permeable section;
providing a portable, constructed cartridge comprising a second constructed wall containing a second volume and with a second opening and a second water permeable section;
housing a filtration media soil within the second volume of the cartridge;
planting a plant with roots in the filtration media soil and such that the plant extends through the second opening from the cartridge;
wherein the cartridge is contained at least in part within the first volume of the filter container in an orientation with the plant extending through the first and second openings, and with the first and second water permeable sections substantially aligned with fluid communication therebetween, and such that the cartridge and planted filtration media soil is removable from the filter container through the first opening;
providing a cistern container with a third wall containing a third volume and with a third water permeable section;
wherein the filter container and cartridge contained therein are positioned in a stacked configuration adjacent to the cistern container in relative orientation together comprising a stacked container pair with the first, second, and third water permeable sections substantially aligned with fluid communication therebetween, such that the stacked filter and cistern container pair together comprise a water filtration and capture module; and
positioning the filter container relative to the flow path such that the volume of water flows into the first opening, through the rooted filtration media soil, across the interfacing first, second, and third permeable sections, respectively, and is captured within the third volume of the cistern container.

38. A method for providing a scalable, modular water filtration system for treating a volume of water along a flow path, comprising:

Providing a plurality of water treatment and collection modules, by providing each module with a portable, constructed filter container with a first constructed wall containing a first volume and with a first opening through which the first volume communicates externally of the first container and also with a first water permeable section;

providing each model a portable, constructed cartridge comprising a second constructed wall containing a second volume housing a filtration media and also with second and third water permeable sections;

housing each cartridge at least in part within the first volume of the respective filter container of the respective module in an orientation with the first and second water permeable sections substantially aligned with fluid communication therebetween, and such that the cartridge is removable from the filter container through the first opening;

providing each module with a cistern container with a third wall containing a third volume and with a third water permeable section;

positioning the filter container and respective cartridge contained therein of each module in a stacked position adjacent to the respective cistern container of the module in relative orientation together comprising a stacked filter and cistern container pair with the first, second, and third water permeable sections substantially aligned with fluid communication therebetween; and positioning each of the plurality of modules approximately adjacent to another of the modules, and with similar relative orientation between the filter and cistern containers of the respective stacked container pairs, so as to form a multi-modular filtration and capture assembly;

coupling an inflow conveyance to direct the volume of water into the multi-modular filtration and capture assembly in a manner to convey the volume of water across the respective individual modules and into the respective filter containers therein; and coupling an outflow conveyance to the cistern containers of the multi-modular filtration and capture assembly in a manner configured to convey the filtered captured water therein out from the system.

\* \* \* \* \*